United States Patent [19]

Sakurada et al.

[11] 4,384,771

[45] May 24, 1983

[54] DATA REGISTRATION DEVICE

[75] Inventors: Nobuaki Sakurada, Yokohama; Masaharu Kawamura, Hino; Shohei Ohtaki, Yokohama; Soichi Nakamoto, Machida; Nobuhiko Shinoda, Tokyo, all of Japan

[73] Assignee: Canon Kabushiki Kaisha, Tokyo, Japan

[21] Appl. No.: 896,614

[22] Filed: Apr. 14, 1978

Related U.S. Application Data

[63] Continuation of Ser. No. 789,838, Apr. 22, 1977, abandoned, which is a continuation of Ser. No. 650,900, Jan. 21, 1976, abandoned.

[30] Foreign Application Priority Data

Jan. 24, 1975 [JP] Japan .................................. 50-10284

[51] Int. Cl.³ ............................................ G03B 17/24
[52] U.S. Cl. .................................... 354/105; 354/109
[58] Field of Search ............... 354/105, 109, 131, 295, 354/266, 175, 238

[56] References Cited

U.S. PATENT DOCUMENTS

| 3,859,635 | 1/1975 | Watson | 340/172.5 |
| 3,953,868 | 4/1976 | Kawamura et al. | 354/109 |
| 3,987,467 | 10/1976 | Cowles | 354/105 |
| 4,001,846 | 1/1977 | Kauneckas | 354/105 |
| 4,053,909 | 10/1977 | Shinoda et al. | 354/105 |

*Primary Examiner*—Russell E. Adams
*Attorney, Agent, or Firm*—Toren, McGeady and Stanger

[57] ABSTRACT

In the disclosed arrangement, a data set separate from a camera includes a set of sequentially actuable numeric entry keys for entering numerical data representing various camera functions into a data control device which transmits data for energizing numerical illuminators at the film plane of a camera through a connecting element.

6 Claims, 31 Drawing Figures

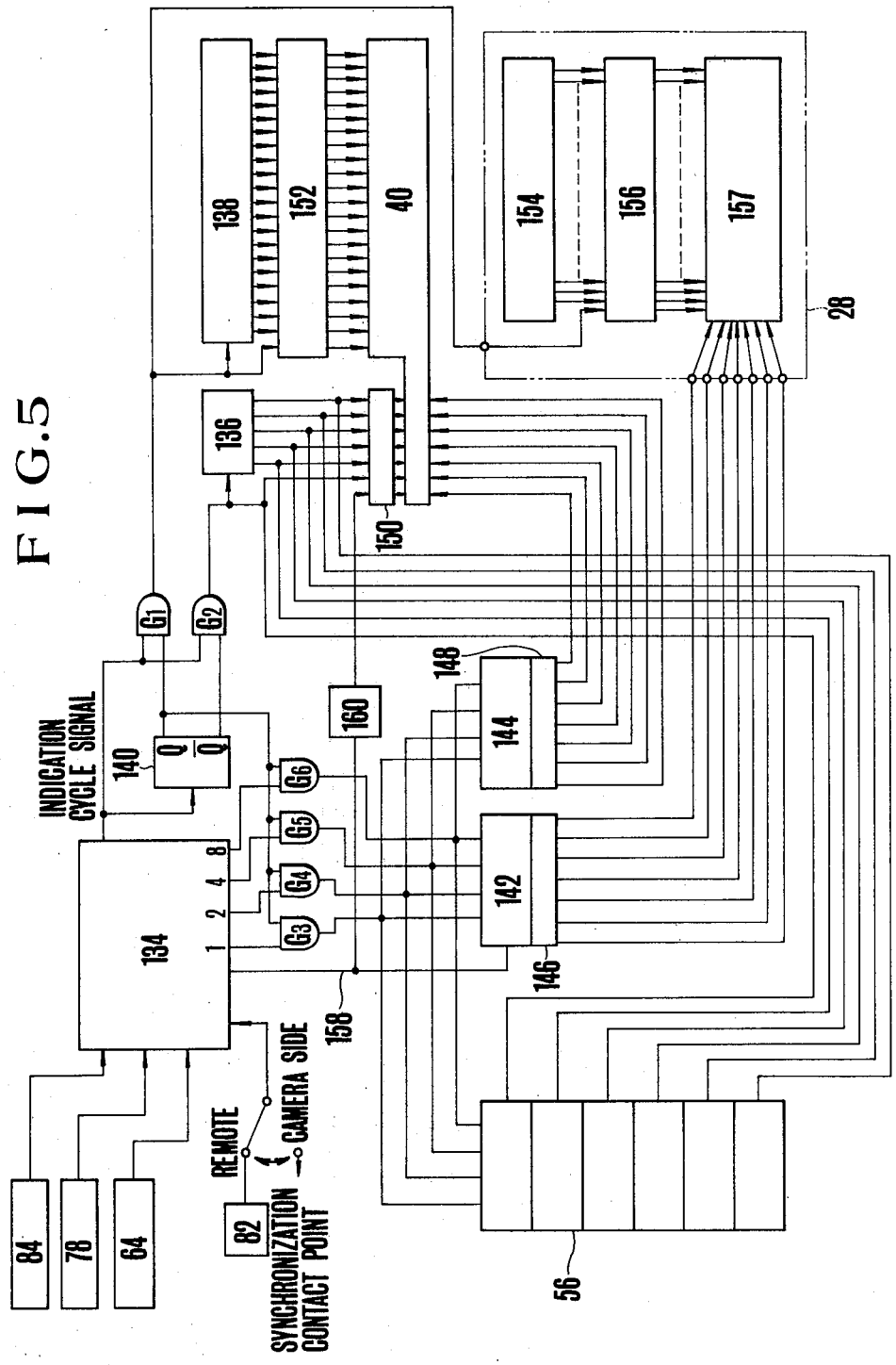

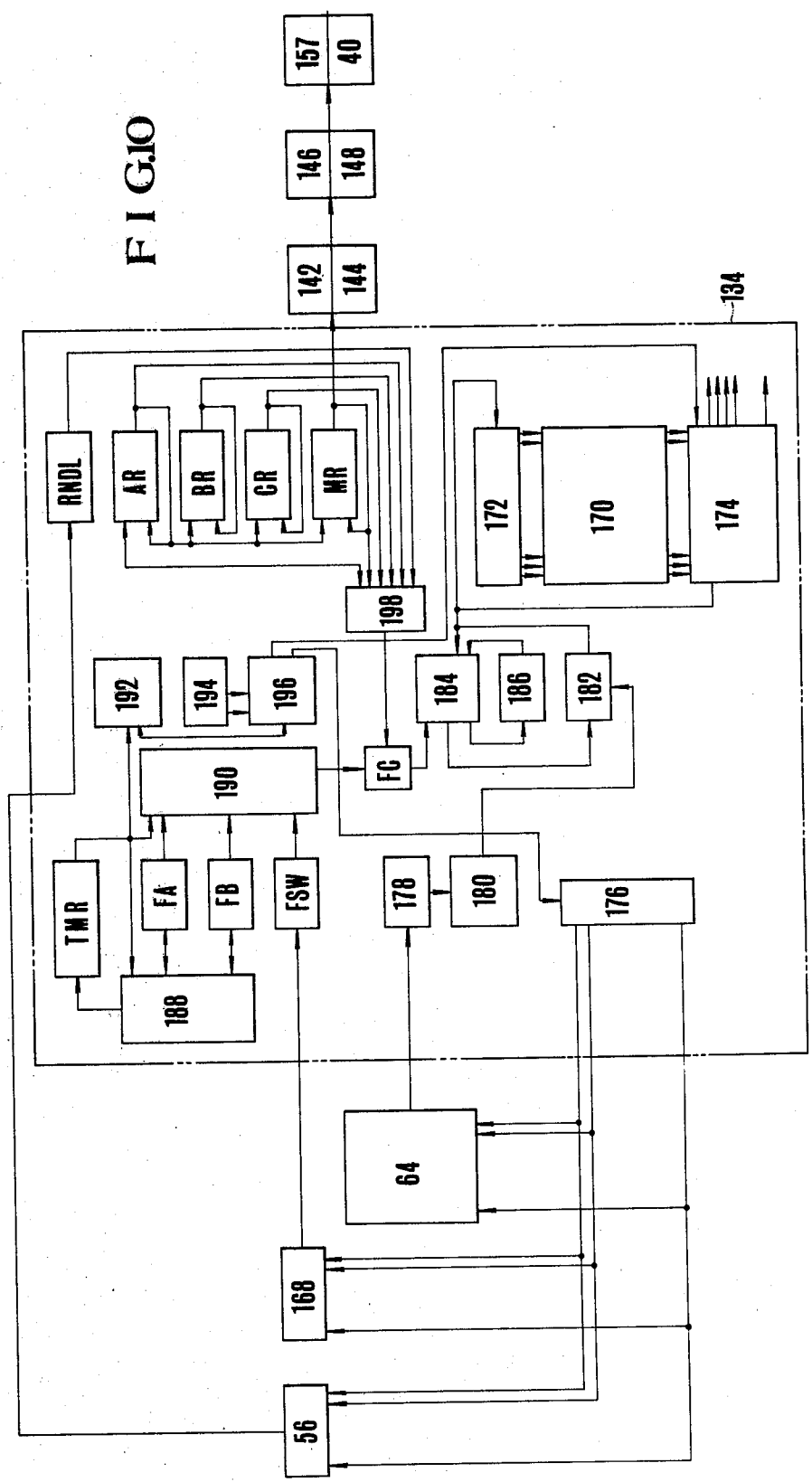

FIG.11a

INSTRUCTION (12 BIT)

| R-PART | | | | G-PART | | | | H-PART | | | |
|---|---|---|---|---|---|---|---|---|---|---|---|
| R8 | R4 | R2 | R1 | G8 | G4 | G2 | G1 | H8 | H4 | H2 | H1 |

INSTRUCTION

| R | R8 R4 R2 R1 | ABBREVIATION | NAME | REMARKS |
|---|---|---|---|---|
| R(0) | 0 0 0 0 | C1 | CONTROL-1 | SEE FIGURE 11b |
| R(1) | 0 0 0 1 | C2 | CONTROL-2 | |
| R(2) | 0 0 1 0 | SF | SENSE FLAG | |
| R(3) | 0 0 1 1 | CG | CHARACTER GENELATE | G8.G4.G2.G1 → AR |
| R(4) | 0 1 0 0 | LD | LOAD | AR ← BR.CR.MR |
| R(5) | 0 1 0 1 | STR | STORE | AR → BR.CR.MR |
| R(6) | 0 1 1 0 | SWP | SWAP | AR ↔ BR.CR.MR |
| R(7) | 0 1 1 1 | SRG | SENSE REGISTER | SENSE NON-ZERO AR.BR.CR.MR |
| R(8) | 1 0 0 0 | ADD | ADD | AR+1 DL RNDL BR.CR.MR |
| R(9) | 1 0 0 1 | SUB | SUBTRACT | AR-1 DL RNDL BR.CR.MR |
| R(A) | 1 0 1 0 | BL | BRANCH & LINK | ADDRESS 9 BIT(RI.GH) |
| R(B) | 1 0 1 1 | | | |
| R(C) | 1 1 0 0 | BU | BRANCH UNCONDITIONALY | ADDRESS 9 BIT(RI.GH) |
| R(D) | 1 1 0 1 | | | |
| R(E) | 1 1 1 0 | BC | BRANCH ON CONDITION | ADDRESS 9 BIT(RI.GH) |
| R(F) | 1 1 1 1 | | | |

FIG.11b

| G | R(0);C1 | R(1);C2 | R(2);SF | R(4)~R(9) |
|---|---|---|---|---|
| G(0) | HALT | | SNZ (SENSE NON-ZERO) | OR (IMAGINARY) |
| G(1) | RDK (READ KEY) | | SNZ – TMR | ONE |
| G(2) | RTN (RETURN) | LS – AR | SNZ – FA | RNDL |
| G(3) | | RS – AR | SNZ – FB | AR |
| G(4) | SET – TMR | | SNZ – FSW | BR |
| G(5) | RES – TMR | | | CR |
| G(6) | LS – TMR | | SNZ – KST | |
| G(7) | RS – TMR | | SZ (SENSE ZERO) | |
| G(8) | | | SZ – TMR | MR |
| G(9) | 0 = FA | | SZ – FA | |
| G(A) | 0 = FB | | SZ – FB | |
| G(B) | | | SZ – FSW | |
| G(C) | 1 = TMR | | | |
| G(D) | 1 = FA | | | |
| G(E) | 1 = FB | | | |
| G(F) | | | SZ – KST | |

FIG.11c

EXECUTE TIMING

| H | ABBREVIATION | REMARKS |
|---|---|---|
| H(0) | T | SPECIAL TIMER (TMR) |
| H(1) | P | P |
| H(2) | E | E |
| H(3) | PE | P, E |
| H(4) | T26 | T26 |
| H(5) | T27 | T27 |
| H(6) | T32 | T32 |
| H(7) | T33 | T33 |
| H(8) | S | S |
| H(9) | X | X |
| H(A) | L | L |
| H(B) | PX | P~X (FULL POSITIONS) |
| H(C) | SX | S~X |
| H(D) | M | M |
| H(E) | LX | L~X |
| H(F) | SM | S~M |

FLAG

| F | EXECUTE TIMING | FA | FB | FSW |
|---|---|---|---|---|
| F(0) | L | O | O | |
| F(1) | S | O | | O |
| F(2) | E | O | | |
| F(3) | P | O | | O |
| F(4) | T27 | O | O | |
| F(5) | T26 | O | | |
| F(6) | T33 | O | | |
| F(7) | T32 | O | | |

FIG.12

FIG. 13
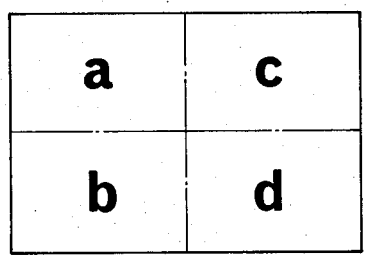
FIG. 14
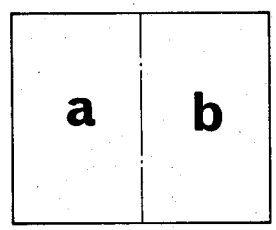
FIG. 16e
| 211 | D2 | 3F0 | CG X'F',T |      | BRANK |
|-----|----|----|-----------|------|-------|
| 212 | D3 | 225 | SNZ-FA T27 |     |       |
| 213 | D4 | ED6 | BC AIAI   |      |       |
| 214 | D5 | C56 | BU KKK    |      |       |
| 215 | D6 | 0E5 | 1=FB T27  | AIAI |       |
| 216 | D7 | C56 | BU KKK    |      |       |

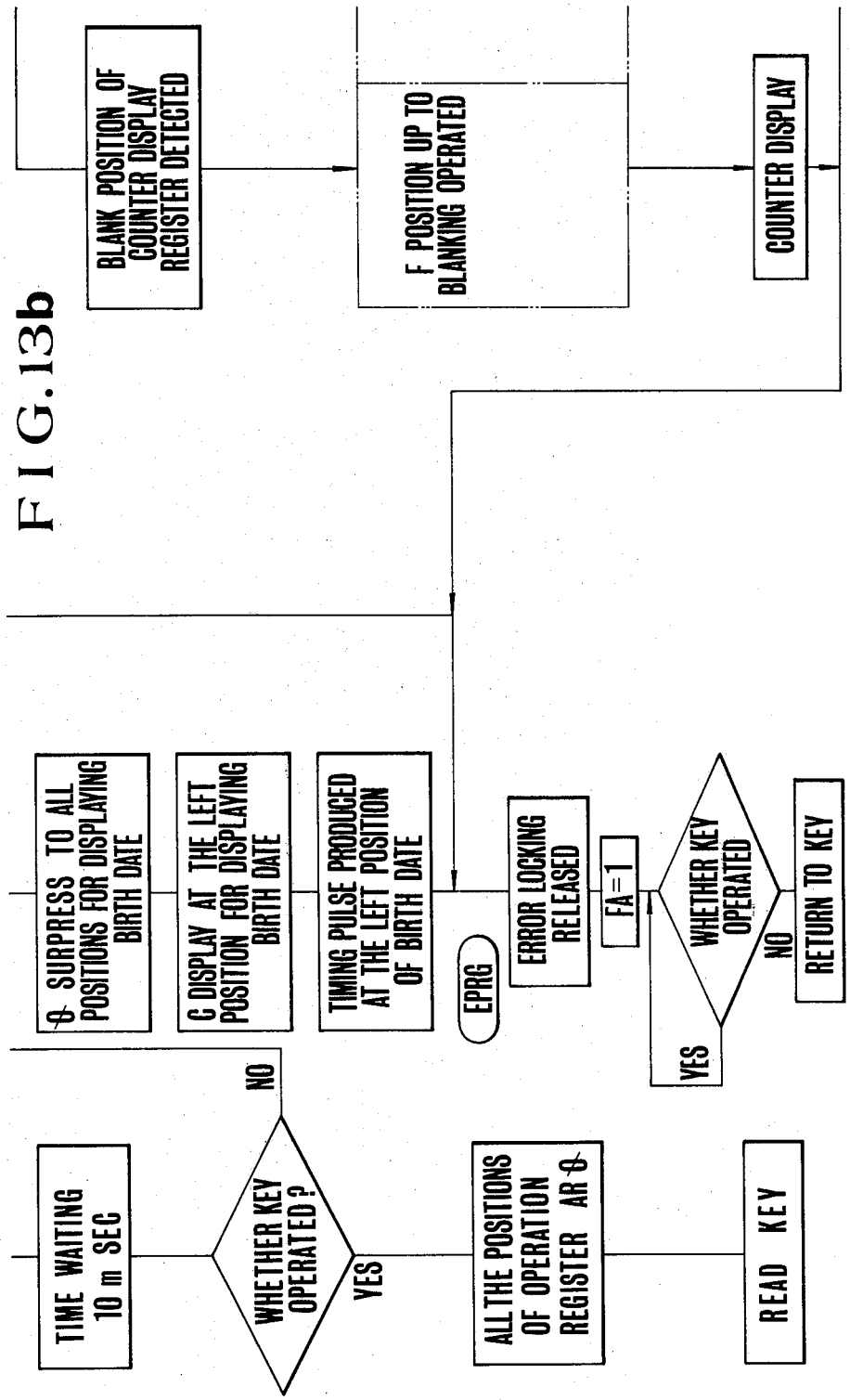

FIG. 16a

| No. | ADDRESS | INSTRUCTION CODE | INSTRUCTION | BRANCH | KEY INPUT DESTINATION |
|---|---|---|---|---|---|
| 1 | 00 | 228 | SNZ-FA S | NNN | |
| 2 | 01 | E04 | BC NOK | | |
| 3 | 02 | 3FB | CG X'F',PX | | |
| 4 | 03 | 68B | SWP MR,PX | | |
| 5 | 04 | 2F1 | SZ-KST P | NOK | |
| 6 | 05 | E00 | BC NNN | | |
| 7 | 06 | 362 | CG 6,E | | |
| 8 | 07 | 912 | SUB ONE,E | AAA | |
| 9 | 08 | 732 | SRG AR,E | | |
| 10 | 09 | E07 | BC AAA | | |
| 11 | 0A | 40B | LD OR,PZ | | |
| 12 | 0B | 2F1 | SZ-KST P | | |
| 13 | 0C | E00 | BC NNN | | |
| 14 | 0D | 010 | RDK | | BIRTH DATE |
| 15 | 0E | A1D | BL CTR | | |
| 16 | 0F | 0D1 | 1=FA P | | |
| 17 | 10 | 045 | SET-TMR T27 | | |
| 18 | 11 | 06E | LS-TMR LX | FFF | |
| 19 | 12 | 0C5 | 1=TMR T27 | | |
| 20 | 13 | 296 | SZ-TMR T32 | | |

| No. | | | INSTRUCTION | CODE No. |
|---|---|---|---|---|
| 21 | 14 | E11 | BC FFF | |
| 22 | 15 | 3F0 | CG X'F',T | |
| 23 | 16 | 3C6 | CG X'C',T32 | |
| 24 | 17 | 580 | STR MR,T | |
| 25 | 18 | 046 | SET-TMR T32 | |
| 26 | 19 | 0D8 | 1=FA S | EPRG |
| 27 | 1A | 271 | SNZ-KST P | |
| 28 | 1B | E19 | BC EPRG | |
| 29 | 1C | 000 | HALT | |
| 30 | 1D | 224 | SNZ-FA T26 | CTR |
| 31 | 1E | 226 | SNZ-FA T32 | |
| 32 | 1F | E23 | BC CDE | |
| 33 | 20 | 3F0 | CG X'F',T | |
| 34 | 21 | 580 | STR MR,T | |
| 35 | 22 | 300 | CG O,T | |
| 36 | 23 | 09B | O=FA PX | CDE |
| 37 | 24 | 0DA | 1=FAL | |
| 38 | 25 | 020 | RTN | |
| 39 | 26 | A1D | BL CTR | |
| 40 | 27 | 0D2 | 1=FA E | |
| 41 | 28 | 04A | SET-TMR L | |
| 42 | 29 | 06E | LS-TMR LX | GGG |
| 43 | 2A | 0CA | 1=TMR L | |
| 44 | 2B | 294 | SZ-TMR T26 | |
| 45 | 2C | E29 | BC GGG | |
| 46 | 2D | 3F0 | CGX'F',T | |
| 47 | 2E | 3C4 | CGX'C',T26 | |
| 48 | 2F | 580 | STR MR,T | |

FIG. 16b

| # | Addr | Instruction | Comment |
|---|---|---|---|
| 49 | 30 | 044 | SET-TMR T26 |
| 50 | 31 | C19 | BU EPRG |
| 51 | 32 | A1D | BL CTR | HEIGHT |
| 52 | 33 | 0D3 | 1=FA PE |
| 53 | 34 | 043 | SET-TMR PE |
| 54 | 35 | 0C8 | 1=TMR S |
| 55 | 36 | 3F0 | CG X'F',T |
| 56 | 37 | 3C8 | CG X'C',S |
| 57 | 38 | 580 | STR MR,T |
| 58 | 39 | 048 | SET-TMR S |
| 59 | 3A | C19 | BU EPRG |
| 60 | 3B | A1D | BL CTR | COUNTER |
| 61 | 3C | 0A5 | 0=FB T27 |
| 62 | 3D | 0D5 | 1=FA T27 |
| 63 | 3E | 0D7 | 1=FA T33 |
| 64 | 3F | 0D4 | 1=FA T26 |
| 65 | 40 | A47 | BL COUN |
| 66 | 41 | 3F0 | CG X'F',T |
| 67 | 42 | 307 | CG O,T33 |
| 68 | 43 | 580 | STR MR,T |
| 69 | 44 | 371 | CG 7,P |
| 70 | 45 | 541 | STR BR,P |
| 71 | 46 | C19 | BU EPRG |
| 72 | 47 | 047 | SET-TMR T33 | COUN |
| 73 | 48 | 06E | LS-TMR LX | YYY |
| 74 | 49 | 0C7 | 1=TMR T33 |
| 75 | 4A | 299 | SZ-TMR X |
| 76 | 4B | E48 | BC YYY |
| 77 | 4C | 020 | RTN |
| 78 | 4D | 810 | ADD ONE,T | 9-KEY |
| 79 | 4E | 810 | ADD ONE,T | 8-KEY |
| 80 | 4F | 810 | ADD ONE,T | 7-KEY |
| 81 | 50 | 810 | ADD ONE,T | 6-KEY |
| 82 | 51 | 810 | ADD ONE,T | 5-KEY |
| 83 | 52 | 810 | ADD ONE,T | 4-KEY |
| 84 | 53 | 810 | ADD ONE,T | 3-KEY |
| 85 | 54 | 810 | ADD ONE,T | 2-KEY |
| 86 | 55 | 810 | ADD ONE,T | 1-KEY |
| 87 | 56 | 2AA | SZ-FA L |
| 88 | 57 | 29B | SZ-TMR PX | KKK |
| 89 | 58 | E19 | BC EPRG |
| 90 | 59 | 0D6 | 1=FA T32 |
| 91 | 5A | 223 | SNZ-FA PE |
| 92 | 5B | E6D | BC BBB |
| 93 | 5C | 441 | LD BR,P |
| 94 | 5D | 911 | SUB ONE,P |
| 95 | 5E | E67 | BC HHH |
| 96 | 5F | 541 | STR BR,P |
| 97 | 60 | 227 | SNZ-FA T33 |
| 98 | 61 | E6A | BC BAKA |
| 99 | 62 | 680 | SWP MR,T |
| 100 | 63 | 120 | LS-AR T |
| 101 | 64 | 487 | LD MR,T33 |
| 102 | 65 | 580 | STR MR,T | 0-KEY |

FIG.16c

| # | Addr | Code | Instruction | Label |
|---|---|---|---|---|
| 103 | 66 | C19 | BU EPRG | |
| 104 | 67 | 401 | LD OR,P | HHH |
| 105 | 68 | 541 | STR BR,P | |
| 106 | 69 | C19 | BU EPRG | |
| 107 | 6A | 587 | STR MR,T33 | BAKA |
| 108 | 6B | 097 | O-FA T33 | |
| 109 | 6C | C19 | BU EPRG | |
| 110 | 6D | 580 | STR MR,T | BBB |
| 111 | 6E | 221 | SNZ-FA P | |
| 112 | 6F | E76 | BC CCC | |
| 113 | 70 | 21A | SNZ-TMR L | |
| 114 | 71 | E74 | BC DDD | |
| 115 | 72 | 07B | RS-TMR PX | EEE |
| 116 | 73 | C19 | BU EPRG | |
| 117 | 74 | 05B | RES-TMR PX | DDD |
| 118 | 75 | C19 | BU EPRG | |
| 119 | 76 | 222 | SNZ-FA E | CCC |
| 120 | 77 | E7B | BC JJJ | |
| 121 | 78 | 215 | SNZ-TMR T27 | |
| 122 | 79 | E74 | BC DDD | |
| 123 | 7A | C72 | BU EEE | |
| 124 | 7B | 211 | SNZ-TMR P | JJJ |
| 125 | 7C | E74 | BC DDD | |
| 126 | 7D | 212 | SNZ-TMR E | |
| 127 | 7E | E80 | BC JEE | |
| 128 | 7F | C72 | BU EEE | |

| # | Addr | Code | Instruction | Label | Label2 |
|---|---|---|---|---|---|
| 129 | 80 | 041 | SET-TMR P | JEE | |
| 130 | 81 | C19 | BU EPRG | | EXPOSURE |
| 131 | 82 | A1D | BL CTR | | |
| 132 | 83 | 421 | LD RNDL,P | | |
| 133 | 84 | 541 | STR BR,P | | |
| 134 | 85 | 311 | CG I,P | | |
| 135 | 86 | 853 | ADD CR,PE | TIME | |
| 136 | 87 | 643 | SWP BR,PE | | |
| 137 | 88 | 911 | SUB ONE,P | | |
| 138 | 89 | E80 | BC MKA | | |
| 139 | 8A | 643 | SWP BR,PE | MKA | |
| 140 | 8B | 553 | STR CR,PE | | |
| 141 | 8C | C86 | BU TIME | | |
| 142 | 8D | 0EA | 1=FB L | | |
| 143 | 8E | 3F3 | CG X'F',PE | MMM | |
| 144 | 8F | 329 | CG 2,X | MBB | |
| 145 | 90 | 919 | SUB ONE,X | | |
| 146 | 91 | 739 | SRG AR,X | | |
| 147 | 92 | E90 | BC MBB | | |
| 148 | 93 | 943 | SUB BR,PE | | |
| 149 | 94 | E96 | BC UMI | | |
| 150 | 95 | C8F | BU MMM | | |
| 151 | 96 | 40B | LD OR,PX | UMI | |
| 152 | 97 | 0AA | O-FB L | | |
| 153 | 98 | 54B | STR BR,PX | | |
| 154 | 99 | 55B | STR CR,PX | | |
| 155 | 9A | A47 | BL COUN | | |
| 156 | 9B | 480 | LD MR,T | | |

FIG.16d

| | | | |
|---|---|---|---|
| 157 | 9C | 05B | RES-IMR PX |
| 158 | 9D | 2B5 | SZ-FB T27 |
| 159 | 9E | EAD | BC HAT |
| 160 | 9F | 06E | LS-TMR LX | RRR |
| 161 | A0 | 0C7 | 1=TMR T33 |
| 162 | A1 | 850 | ADD CR,T |
| 163 | A2 | EA9 | BC SSS |
| 164 | A3 | 299 | SZ-TMR X |
| 165 | A4 | E9F | BC-RRR |
| 166 | A5 | ACA | BL UUD | OPP |
| 167 | A6 | 580 | STR MR,T |
| 168 | A7 | 05B | RES-TMR PX |
| 169 | A8 | C19 | BU EPRG |
| 170 | A9 | 480 | LD MR,T | SSS |
| 171 | AA | 057 | RES-TMR T33 |
| 172 | AB | 07E | RS-TMR LX |
| 173 | AC | CA5 | BU OPP |
| 174 | AD | 049 | SET-TMR X | HAT |
| 175 | AE | 730 | SRG AR,T |
| 176 | AF | EB2 | BC KOBA |
| 177 | B0 | A47 | BL COUN |
| 178 | B1 | CA5 | BU OPP |
| 179 | B2 | 850 | ADD CR,T | KOBA |
| 180 | B3 | EBE | BC TAH |
| 181 | B4 | A47 | BL COUN |
| 182 | B5 | ACA | BL UUD |

| | | | | |
|---|---|---|---|---|
| 183 | B6 | 049 | SET-TMR X | |
| 184 | B7 | 730 | SRG AR,T | SPP |
| 185 | B8 | EC6 | BC COO | |
| 186 | B9 | 3F0 | CG X'F',T | |
| 187 | BA | 217 | SNZ-TMR T33 | |
| 188 | BB | FC5 | BC PAPA | |
| 189 | BC | 07E | RS-TMR LX | |
| 190 | BD | CB7 | BU SPP | |
| 191 | BE | 217 | SNZ-TMR T33 | TAH |
| 192 | BF | EC3 | BC POP | |
| 193 | C0 | 300 | CG O,T | |
| 194 | C1 | 07E | RS-TMR LX | |
| 195 | C2 | CB2 | BU KOBA | |
| 196 | C3 | 05B | PES-TMR PX | POP |
| 197 | C4 | C19 | BU EPRG | |
| 198 | C5 | 307 | CG O, T33 | PAPA |
| 199 | C6 | A47 | BL COUN | COO |
| 200 | C7 | 580 | STR MR,T | |
| 201 | C8 | 05B | RES-TMR PX | |
| 202 | C9 | C19 | BU EPRG | |
| 203 | CA | 248 | SNZ-FSW S | UUD |
| 204 | CB | ED6 | BC XXX | |
| 205 | CC | 241 | SNZ-FSW P | |
| 206 | CD | ECF | BC RTN | |
| 207 | CE | 910 | SUB ONE,T | |
| 208 | CF | 020 | RTN | RTN |
| 209 | D0 | 810 | ADD ONE,T | XXX |
| 210 | D1 | CCF | RU RTN | |

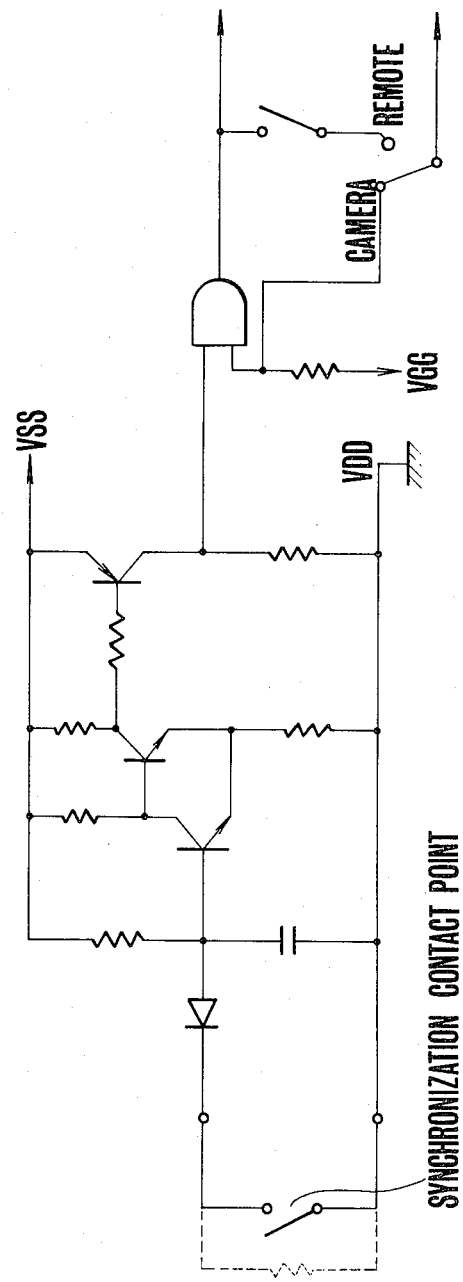

DATA REGISTRATION DEVICE

This is a continuation of application Ser. No. 789,838 filed Apr. 22, 1977, abandoned, which in turn was a continuation application of Ser. No. 650,900, filed Jan. 21, 1976, abandoned.

BACKGROUND OF THE INVENTION

1. Field of the Invention

The present invention relates to a data registration device particularly suited for a camera which exposes a photosensitive surface to the desired data as well as to an image to be recorded.

2. Description of the Prior Art

Generally a camera is used for recording images. However, it sometimes becomes necessary to record not only images but also data referring to the images. Some examples of such instances are scientific photographs, photographs of civil engineering and construction work, medical photographs such as of an X-ray, microphotographs, photographs of a large number of similar objects, etc. There exist cameras capable of recording photographic data such as film sensitivity, exposure time, aperture value and so on, on the photosensitive film together with images, or of recording data referring to the persons concerned with such as date of birth, height, weight, and so on the film when preparing personal identifications.

For such requirements, various systems have so far been proposed and put in practice. One example thereof is the exposure of data on an X-ray photograph. In a snapshot camera, the photographing date is recorded on the film together with the image. In another camera, the face plate of a built-in time piece is recorded on the film together with the image. A method may involve manually preparing or printing data to be recorded with the image on a transparent sheet to be set in a camera and exposed to the photosensitive film together with the image.

As explained above, various proposals for recording data belonging to the image on the film surface, together with the image, have already been made. If the data to be recorded is merely date or time, the data setting is made by means of a simple selection switch or by means of a built-in time piece so that even when taking a number of photographs the photographic efficiency is hardly influenced. The same thing can be said of a camera in which a data sheet on which the date is prepared manually or by printing is set so as to be recorded on the film together with the image. This is so because a large number of photographs are taken on the same day and there is no necessity of rewriting the data. Hence, the photographic efficiency is hardly affected.

If, on the other hand, the data to be recorded together with the image differ from photograph to photograph, especially if the quantity of the data to be changed from photograph to photograph is large, the data setting operation becomes troublesome if the data is prepared manually or by printing or by means of a conventional selection switch. The possibility of missetting of data arises and the photographic efficiency is lowered especially when a large number of photographs are taken.

A photographic system for preparing personal identifications may require recording a territory or department code consisting of four figures, the last two figures of the year of the photograph, the photographic series number consisting of seven figures, the personal name code consisting of four figures, the date of birth consisting of six figures and the height consisting of three figures. Thus, photographic data consisting of all together 26 figures may be recorded on the film together with the image of the face of the person concerned.

In order to record the data on the film numerical display, illuminating elements with 8 segments consisting of conventional illuminating diodes are arranged to correspond to the 26 figures and the segments of the illuminating diodes for the figures concerned are selectively made to illuminate in accordance with the set data. This displays figures corresponding to the data to be recorded. Such a numerical figure display is exposed at a predetermined position of the film for the corresponding image either directly or through a specially prepared lens from the direction of the objective lens or from the back pressure plate.

In such an arrangement, six of the 26 figures, i.e., the code of the territory or the department consisting of four figures and the last two figures of the photographing year, change rarely, while of the other 20 figures at least 14 figures have to be changed from photograph to photograph. (A change is made on the last figure in the photographic series number consisting of seven figures.) Therefore, if each numerical figure in the data is set by means of a mechanical selection switch (for example, the conventional digital switch and so on), or a rotary switch, the operation is troublesome. This is so especially in case of identification cards for which a large number of persons are successively photographed, the photographing efficiency is decreased and the danger of missetting of data increases.

Thus, a new system according to which the data to be recorded can be set rapidly with little danger for missetting of data is needed.

A way to meet the above-mentioned requirement is with the data input system of an electronic desk computer according to which the data is set by means of the conventional ten keys. In order to set data consisting of 26 figures by means of the ten keys, it is sufficient to select a key corresponding to 0–9 out of the ten keys successively. This improves the operation efficiency. On the other hand, if all figures are cleared by the clear key due to misoperation, the data setting operation has to be repeated. Even if only one figure in the data has to be changed, all figures have to be cleared and the data setting for 26 figures has to be carried out. This is a great disadvantage.

On the other hand, the exposure of the data relating to the image has to be made in connection with the shutter release, the exposure, the film winding and so on at the camera so that it is essential to take a proper interface to the camera into consideration. The interface for the timing of data exposure, the proper exposure for the data recording and the ordinary operation of the camera is very important for the set data to be recorded exactly at the determined position of the film piece on which the image is to be exposed or has been exposed.

What is mentioned above is especially important if the camera is remote controlled. The reason is that in an automatic or motor driven winding system, the film is wound up immediately after the termination of the exposure of the image even if the data concerning the image has not yet been exposed. Thus, there is a possibility of not sufficiently exposing the data.

SUMMARY OF THE INVENTION

A purpose of the present invention is to provide a data registration device with very high efficiency for recording data other than the image on the photosensitive film.

Another purpose of the present invention is to provide a data registration device by means of which a large quantity of data can be set rapidly while the data can be changed quite efficiently.

Further, another purpose of the present invention is to provide a data registration device whereby a proper interface is provided between the data registration device and the camera which records the data belonging to the image on the photosensitive film together with the image.

Further, another purpose of the present invention is to provide a data registration device by means of which the data can be set efficiently by semi fixing the data not to be changed so often, enabling the change of the data from item to item, the correction of the misset data and further the setting of data of an item into the position for the data of other items.

Further, another purpose of the present invention is to provide a novel data registration device which is not expensive and quite universal despite its very simple construction by controlling, for the most part, a series of operations for data setting and exposure of the set data on the photosensitive film together with the image by means of a microprogrammed control system and integrating the device.

BRIEF DESCRIPTION OF THE DRAWINGS

FIG. 5 shows a block diagram of the circuit composition of the device shown in FIG. 1.

FIG. 10 shows the detailed block diagram of the circuit composition of the central operation control part shown in FIG. 5.

FIG. 11 shows the instruction system of the microprogramming for controlling the circuit composition shown in FIG. 10.

FIG. 12 shows the chart for showing the operation time of each register.

FIG. 16 shows the comparison between the addresses and the instructions of the read only memory shown in FIG. 10.

FIG. 19 shows the circuit composition of the synchronization contact to be applied for the present invention.

DESCRIPTION OF PREFERRED EMBODIMENTS

Figure 1:
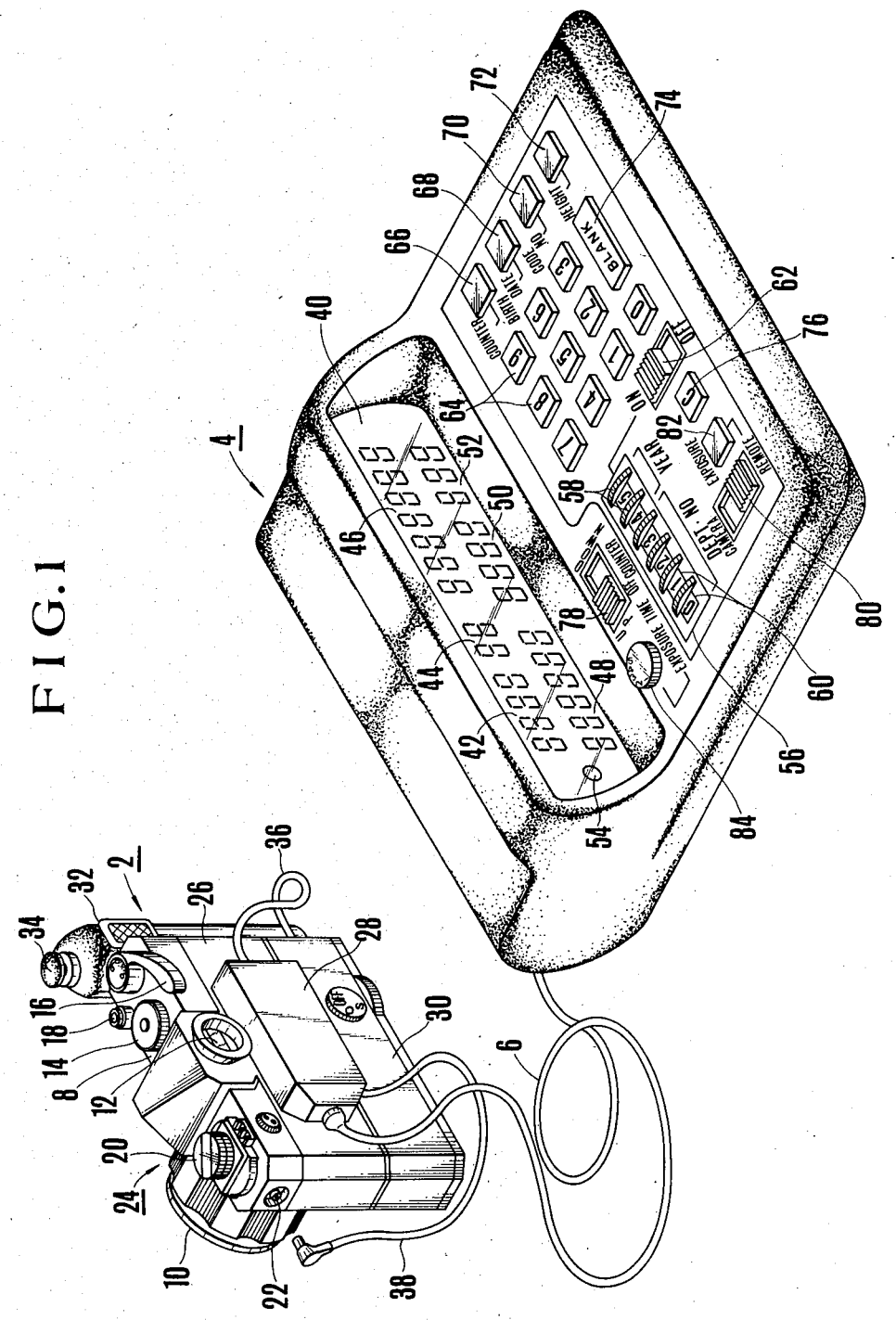
FIG. 1 is a perspective view of an embodiment of the data registration device in accordance with the present invention.
Figure 2:
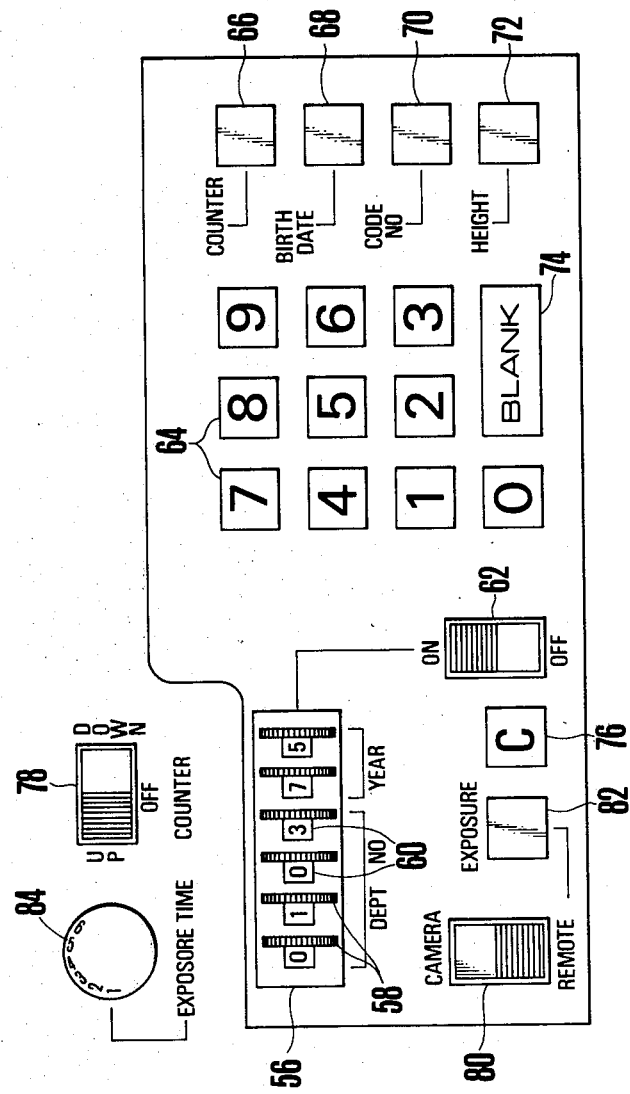
FIG. 2 is a plan view of the control panel of the device shown in FIG. 1.

FIG. 1 shows an embodiment of the data registration device in accordance with the present invention in perspective view while FIG. 2 shows a plan view of the control panel of the device shown in FIG. 1. The present embodiment of the data registration device is arranged to take a picture for a personal identification card. Specifically, it is arranged to print the code of the department to which the person belongs, the date of photograph the series number of photograph, the date of birth, the code of the name and the physical data such as the height on the picture of the person being photographed. The present device can roughly be divided into two portions, namely a camera part or portion 2 for taking a picture of the person and simultaneously recording the data concerning the person in the picture, and the control part, portion or set 4 for setting the data and remote controlling the camera 2. The parts are connected to each other by means of a control signal wire 6. Hereby the camera 2 is composed of a conventional camera device or camera 24 including a camera body 8, a photographic lens, 10, a viewfinder window 12, a shutter speed setting dial 14, a film winding lever 16, a shutter release button 18, a film winding back knob 20, a contact 22 for synchronization and so on, a data printing device 28 provided on the back cover 26 demountably mounted on the above mentioned camera device 24 so as to print the data set by the control part 4 on the film not shown in the drawing, in the camera device 24 and a motor drive device 30 mounted on the camera device so as to carry out the shutter release and the film winding. The motor drive device 30 includes a control grip 32 with a release button 34 for initiating the shutter release and the film winding operation. The same operation can also be carried out by means of the remote control signal wire 36. Namely, the above mentioned signal wire 36 connects the data printing device to the control part 4 by means of the signal wire 6 in such a manner that the motor drive device 30 can be remotely controlled from the control portion 4. The data printing device 28 is connected to the synchronizing contact 22 by a signal wire 38 in such a manner that a control signal is obtained for making the data printing device 28 ready for operation when the shutter is released in the camera 2 as explained later.

In the control portion 4, a monitor display panel 40 shows the data to be printed on the film by means of the above mentioned data printing device 28. The panel is composed of 8 segments of cold cathode figure display tubes or illuminating diode figure display tubes so as to display 26 numerical figures. The numerals are divided into a numerical figure display part 42 for displaying 4 numerical figures representing the code of the department to which the person belongs, another numerical figure display part 44 for displaying 2 numerical figures representing the last two figures of the photographing year, another numerical figure display part 46 for displaying 7 numerical figures representing the photographic series number, a numerical figure display part 48 for displaying 6 numerical figures indicating the date of birth, further another numerical figure display part 50 for displaying 4 numerical figures representing the code of the personal name and another numerical figure display part 52 for displaying 3 numerical figures representing the height together with the exposure display part 54 which lights while the film is exposed with the above mentioned data by the data printing device. A digital switch 56 serves for setting semi-fixed data, such as the code of the department to which the person belongs, the photographing date and so on whose alteration is not necessary for each photograph. The switch 56 is composed of dials 58 for setting data and of a window 60 for confirming the set data. The data set by the above mentioned digital switch 56 is controlled by the slide switch 62 which is opened or closed in such a manner that in the closed state the data set by the digital switch 56 is displayed on the display panel 40 and printed on the film by means of the data printing device 28 at the time of exposure. Numerical figure input keys 64 serve for setting data. By successively moving keys 64 after having pushed the function key 66 for setting the photographic series number, the count starting number for the photographic series number is set and displayed on the photographic series number display part 46 on the display panel 40. By successively pushing keys 64 after having pushed the function key 68 for setting the date of birth, the data for the date of birth is set and displayed on the date of birth display part 48 on the display panel 40. By successively punching keys 64 after having pushed the function key 70 for setting the code of the personal name, the code of the personal name is set and displayed on the code of the personal name display part 50 on the display panel 40 and by successively selecting keys 64 after having pushed the function key 72 for setting the height, the data for the height is set and displayed on the height display part 52 on the display panel 40. Every function key 66, 68, 70 and 72 serves as a clear key so that by selecting the proper function key before the input setting of each data with keys 64, the data previously set is cleared and a new input can be accepted. Key 74 is the blank key which is operated in order to provide a space between the numerical figures at the time of input setting of each data by selecting the key 64. Key 76 is the clear key which serves to clear all the other data than what is set by means of the digital switch 56.

Below the input setting of each data group will be explained in more detail.

When the function key 66 for entering the count start data of the photographic series number is selected, "0" is set at the last position of the seven figures corresponding to the data and then by selecting a figure setting key 64, the "0" previously set is cleared so that the count start data of the photographic series number is entered from the last figure position. Therefore, the figure setting by means of the keys 64 is not necessary in case it is desired that the count should be started from "0". As to the photographic series number, either of the three states, namely the count up, the count down, and the count stop can be selected by means of the count instruction switch 78. When the count up instruction is selected, "1" is added to the photographic series number data with every photograph while when the instruction of the count down is selected "1" is subtracted from the photographic series number data with every photograph and when the instruction of the count stop is selected, the alteration of the photographic series number with every photograph is stopped. This function of the count stop is valuable when seven numerical figures corresponding to the photographic series number are provided on the film with other data set. If at the time of printing the photographic series number the seven numerical figures are too much, other data should be set for the spare space. After setting other data by means of the keys 64, the blank key 74 is operated so as to obtain one or more blanks and the count start data for the photographic series number is entered. In this case, even if the photographs are counted up or down, the counting is carried out within the range of the set number of the numerical figures and even if the counting surpasses the set number, it does not go beyond the number at which the blank is provided. When, for example, if the seven numerical figures for the photographic series number other data are set, it is desired that the counting should be started from "0", while reserving three numerical figures for the counting, neither the count up nor the count down influences the number of the blanks. Hence, the place for the count start data at which it is necessary to set "000" after operating the blank key, having set other data, is different from that for the input of the ordinary count start data. The blanks can be provided at any places in the seven figures for setting the photographic series number. For the count start data only the data smaller than the figures under the lowest blank can be used.

When either of the function keys for setting the date or birth, the code of the personal name, the height and so on is pushed, at the highest position of the corresponding data figures of the monitor display panel 40, a figure other than a numeral, such as the figure " ⌐ ", is displayed so as to indicate the portion at which the numerical figures are set by means of the key. When the numerical figure at the highest position of the necessary data is entered in the key 64, the display " ⌐ " disappears and the entered numerical figure is displayed instead of " ⌐ ". After that, by successively entering the data from the higher position, the necessary data is set at the setting portion for such data. In this arrangement, the date of birth, the code of the personal name and the height are respectively set within the range of 6 figures, 4 figures, and 3 figures. Hence, if the numerical figures to be successively entered and corresponding to the data surpass the corresponding range of figures, input of the excess figures is restricted. The same thing can be said of the setting of the count start data of the photographic series number.

As explained, when the data set at the corresponding setting portion is cleared by pressing any of the function keys 66, 68, 70 and 72, the portion is made ready for accepting the new data. In this case, when the function key 66 for setting the count start data for the photographic series number is pressed, the thus-far set data is cleared and "0" is set at the lowest position in the corresponding setting portion. This is displayed at the display part 46 on the display panel 40. When either of the function keys 68, 70 and 72 for setting the date of birth, the code of the personal name and the height is pushed, the data set so far is cleared and the signal " ⌐ " is set at the highest position of the corresponding setting portion. This is displayed at either of the display parts 48, 50 and 52 on the display panel 40. When the clear key 76 is operated, all the set data other than the semi-fixed data set by means of the digital switch are cleared. Hence "8" or "⊏" is not displayed and no data is entered even if the numerical figure setting key 64 is operated. The symbol "⊏" serves to indicate the setting portion for the data to be set by means of the numerical figure setting key 64, and even if a function key is operated, no data is entered while when another function key is operated. The symbol "⊏" moves to another position so as to indicate the setting portion for the data newly selected. Further, the symbol "⊏" only serves to indicate the data setting portion on the monitor display panel 40 and automatically put out immediately before the data printing on the film.

In the printing control for recording the set data on the film, a change over or selector switch 80 determines whether the shutter is released at the camera part 2 or the shutter is remote controlled at the control part 4. When the switch 80 is set at the camera, the shutter is released by means of the shutter release button 18 on the camera 24 or the shutter release button 34 on the control grip 32 of the motor drive device 30. When the switch 80 is set by the remote control, the shutter is released by the exposure button on the control part 4. When the shutter is released by the remote control, a control signal arrives at the motor drive device 30 from the control part 4 through the signal wires 6 and 36 so as to release the shutter and wind the film. The personal image from the lens 10 is then recorded on the film not shown in the drawing while the data set for the corresponding person is recorded on the film from the data printing device 28. In this case, the timing of the data recording is controlled by the control part 4. Further, if the shutter is operated at the camera, as in case of the remote control, the personal image and the corresponding data set are recorded. The timing for the data recording is controlled by the signal obtained through the signal wire 38 from the synchronization contact 22 so as to indicate that the shutter has been released.

The system makes it possible to vary the exposure time for data to account for differences in film sensitivity or desired intensity. In the present embodiment, the data exposure time of the data printing device 28 can be selected over 6 steps, namely 40 msec, 80 msec, 160 msec, 320 msec, 640 msec and 1280 msec, whose selection can be made by an exposure time selecting dial 84. If the motor drive 30 winds the film immediately after the shutter release and the exposure of the personal image, and if the shutter time is shorter than the data exposure time, there is a danger that the printed data will be blurred. In the present embodiment, when the shutter is released at the camera, namely when the shutter is released by operating the shutter release button 34 on the control grip 32 of the motor drive device 32 in the camera part 2, the film is not wound unless the button 34 is released. Hence, it is possible to print the data properly by releasing the shutter release button only after the illumination at the exposure display part 54 is out, while monitoring the exposure display part 54 on the display panel 40 in the control part 4 illuminating during the data exposure. When the shutter is released at the camera part 2, film winding by the motor drive device 32 starts only after the rear shutter curtain has started. Thus, it is possible to print the data without fail even when the exposure time for the data printing is longer than the exposure time by means of the camera device 24, by operating the film winding with the "AND" condition of the completion of the running of the rear shutter plane and the termination of the data exposure after the shutter release.

Figure 3:
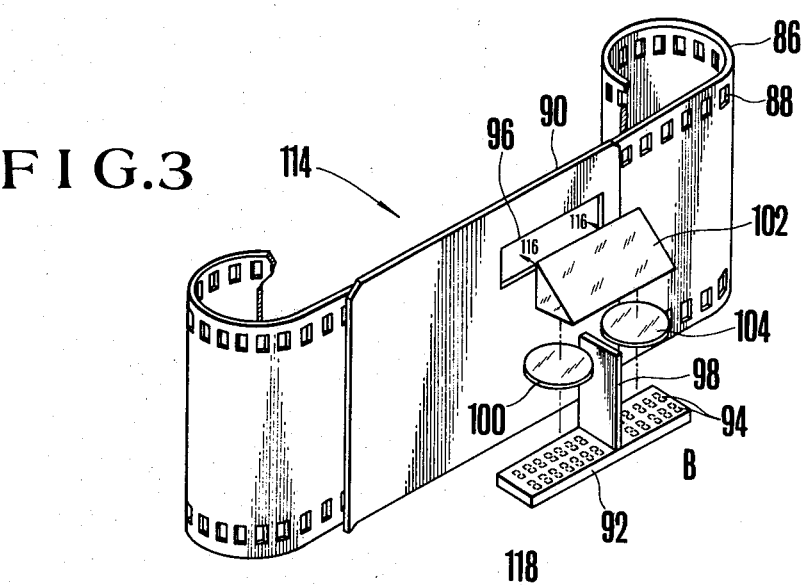
FIG. 3 is a perspective view of the internal composition of the data printing device.

The data printing device 28 is constructed as shown in perspective view in FIG. 3. Here, roll film 86, loaded in the camera device shown in FIG. 1, contains film feeding sprocket holes 88. Member 90 is a film pressing plate provided on the back cover so as to keep the focus plane, 92 a data printing control mechanism composed of the integrated control circuit for the data recording and having on its upper surface 26 numerical figure display elements composed of "8" shaped illumination diode segments, 96 a printing opening provided in the film pressing plate 90 so as to print the data on the film 80 from the back side, and 98 a shading plate for dividing the numerical figure display elements 94 on the data printing control mechanism into a part for 12 figures and another part for 14 figures. A printing lens 100 forms the image of the 12 figures of the numerical figure display element 94 on the photosensitive surface from the back of the film through the reflecting prism 102 and the printing opening 96. A printing lens 104 forms the image of the 14 figures of the numerical figure display element 94 on the photosensitive plane from the back of the film through the reflecting prism 102 and the printing opening 96. In this structure, the personal image is exposed on the film along the direction of the arrow 114 through the photographic lens 10 of the camera device 24 while the image of the data to be printed with the personal image is formed and exposed on the film from the back along the direction of the arrow 116 through the printing lenses 100 and 104 and the reflecting prism 102. The segments of the numerical figure display elements 94 are formed during the time selected and set by means of the exposure time setting dial 84 in accordance with the set data in such a manner that the personal image and the data image are exposed on the film at the same time.

As explained above from the thus obtained film 86, a print with the personal image 118 and the data image 120 corresponding to the person can be obtained. In the above mentioned data 120, 122 the code of the department to which the person belongs, 124 the last two figures of the photographing year, 126 the photographic series number, 128 the date of birth, 130 the code of the personal name and 132 the height.

Figure 4:
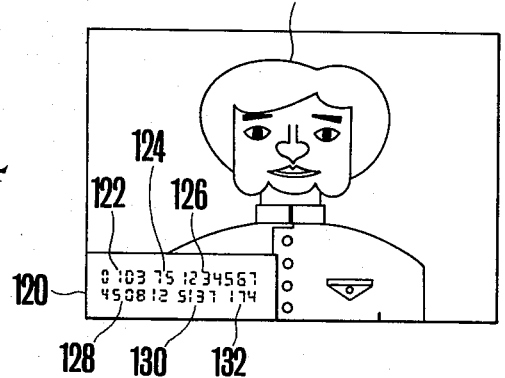
FIG. 4 shows a plan view of the picture in which the data is printed by means of the device shown in FIG. 1.

The order for setting the data when the personal image 118 and the data 120 belonging to the person are exposed is shown in FIG. 4. Assuming that the code of the department to which the person belongs is "0103", the last two figures of the photographing year "75", the photographic series number "1234567" (the count start data especially in the present case), the date of birth "450812", the code of the personal name "5135" and the height "174". In the present case, the code of the department to which the person belongs and the photographing year are the semi-fixed data so that they are set by means of the digital switch 56. The necessary numerical figures are selected by rotating the dial 58 and confirming the figures through the display window 60. (The semi-fixed data thus set are those to be exposed to the film, the slide switch 62 should be set at the side of "switch on"). At this time, at the display part 42, for the code of the department to which the person belongs and at the display part 44 for the photographing year on the display panel, the set data "0103" and "75" are displayed. When the function key 66 is then selected so as to set the count start data of the photographic series number, at the display part 46 for the photographic series number on the display panel 40, "0" is displayed at the last position. When "1" in the first position of the count start data is then selected by means of the key 64, the display "0" is entered and in its stead "1" is displayed at the last position in the display part 46. After then by successively pressing the keys "2", "3", ... "7", the numerical figures at the display part 46 is successively shifted up to the higher position one by one whereby the newly set figure is displayed at the last position. As explained above, when the count start data for the photographic series number is set, it is necessary to select by means of the switch 78 whether the photographs are counted up or down or not counted. Hence, the selection and the setting can be carried out according to the necessity. When then the function key 68 is selected so as to set the date of birth, " C " is displayed at the first position of the display part 48 for the date of birth on the display panel 40. When "4" at the first position of the data of birth is then selected by means of the keys 64, the display " C " is put out and in its stead " 4 " is displayed at the first position of the display part 48. After that, by successively selecting "5", "0", "8", "1" and "2" by means of the keys 64, the newly selected figures are successively displayed from the higher position of the display part 48. When the function key 70 is then selected so as to set the code of the personal name, " C " is displayed in the first position at the display part 50 for the code of the personal name of the display panel 40. When " 5 " at the first position of the code for personal name is selected by means of the keys 64, the display " C " is put out and in its stead " 5 " is displayed at the first position of the display part 50. After that, by successively selecting "1", "3" and "7" by means of the keys 64, the newly set figures are successively displayed from the higher position in the display part 50. When the function key 72 is then pressed so as to set the height, " C " is displayed in the first position in the display part 52 for the height on the display panel 40. When "1" at the first position of the height is then selected by means of the keys 64, the display " C " is put out and in its stead "/" is displayed at the first position in the display part 52. After that, by successively selecting "7", and "4" by means of keys 64, the newly selected figures are successively displayed in the display part 52. In the operation explained till now, all the necessary data to be exposed have been set. The data displayed on the monitor display panel 40 completely correspond with the data set to be exposed. Hence, at the time of setting the data corresponding to the function keys 66, 68, 70 and 72 by means of the keys 64, even if the numerical figures surpass the number of the figures entered, the data setting operation is locked and therefore such numerical figures cannot be set as explained above.

The exposure time for exposing the film surface to the thus set data is selected by means of the exposure time setting dial 84. Further, whether the shutter is released at the camera part 2 or at the control part 4 is selected by means of the selector switch 80. When the shutter is released from the camera part 2, the connection of the control part 4 to the motor drive device 30 by means of the signal wire 36 is not necessary while the connection of the contact 22 for synchronization by means of the signal wire 38 is necessary. When, on the other hand, the shutter is released from the control part 4, the signal connection of the control part 4 to the motor drive device 30 by the signal wire 36 is necessary while the connection of the contact 22 for synchronization by means of the signal wire 38 is not necessary. Then, various exposure conditions, the distance condition and so on are set on the camera device 24 so as to take a photograph of the person. The shutter is released when the photographic conditions have been completed in this way. If the shutter is released from the camera part 2, the shutter is operated by means of the shutter release button 18 on the camera device body 24 or by means of the release button 34 on the control grip 32 of the motor drive device 30. If the shutter is released from the control part 4, the shutter is operated by means of the exposure button 82 of the control part 4. When the shutter is released, the pictorial image is exposed through the photographic lens 10 of the camera device 24 while the numerical figure display elements 92 built in the data printing device 28 light during the time set by means of the exposure time setting dial corresponding to the set data. This occurs in such a manner that the data previously set and displayed on the display panel 40 of the control part 4 are exposed to the film from the back. At this time, the exposure display part 54 on the display panel 40 light while the numerical display elements in the data printing device 28 light so as to indicate that the data are exposed. When the exposure ends as explained above, the winding of the film 86 and the shutter charge are carried out by means of the motor drive device 30 only when the shutter is released by means of the shutter release button 34 provided on the control grip 32 of the motor drive device 30 or by means of the exposure button 82 of the control part 4. Further, for the set value of the photographic series number the count up is selected by means of the switch 78, "1" is added at every data printing while when the count down is selected "1" is subtracted in such a manner that the photographic series number is renovated. It goes without saying that the set value is not varied if the switch 78 is selected at the stop position.

After the above mentioned operation, the data for the next photograph are set. Hence, the data for the next person, namely only those for the date of birth, the code of the personal name, and the height can be entered and selected quite easily by selecting the function keys 68, 70 and 72 and the keys 64 for data pressed.

As explained so far, the data registration device in accordance with the present invention, enables rapid data setting as well as rapid photography when the photographic device is composed for personal identification whereby the serviceability of the device is much improved.

By means of the present embodiment of the data registration device, the following advantages can be realized;

(1) The data setting can be operated quite easily and rapidly because it is possible to set the data to be recorded together with the image by means of a key input device of ten key system.

(2) When taking a photograph, the shutter can be either directly released from the camera or remote controlled from the control part whereby in either of the photographic modes, the data belonging to a person can be recorded together with the image so that the flexibility and the efficiency of the photographic operation can greatly be improved.

(3) The area and the kind of data to be exposed to the same film piece as the personal image can easily be changed so that not only the photographic device for the personal identification card but also other photographic devices, especially for treating many kinds of data can be realized whereby the universality of the device can be much enlarged. Especially in case all the figure positions prepared for the data of the photographic series number are not needed to be used, the utilization efficiency of the device can be much improved by making use of positions other than those for data of the photographic series number in order to record semi-fixed data.

(4) Moreover, the data to be recorded on the film together with the image can be confirmed in advance by means of the monitor display panel so that the recording of mistaken data can be avoided.

(5) The time during which the set data is being recorded can be confirmed by means of the exposure display lamp so that it is possible to confirm whether the data is duly recorded.

(6) While recording the set data, it is possible to preset the exposure time, namely the exposure amount for the data recording so that it is possible to easily decide the tone and the clearness of the data to be recorded together with the image.

(7) By providing a proper interface between the motor drive device on the camera and the control part for the data recording, it is possible to prevent the film winding from being carried out before the data recording has been completed. Hence, it is possible to record exact data by means of a long time exposure.

(8) The electronic circuit in the control part can be made compact so that the device can be compact and light by mounting an integrated circuit in the data recording device provided in the back cover of the photographic device.

As explained above, the operation efficiency and the universality of the present embodiment of the data recording device are extensive. The components of the device needed for obtaining the above mentioned efficiency are as follows.

In order to realize the various advantages mentioned so far, the present embodiment of the data recording device is constructed as shown by the block diagram shown in FIG. 5. Here, a central operation control part or operation control 134 receives the control input from the input keys 64, the function selection switch 78 of the counter, the exposure time setting dial 84, the exposure button 82 or the synchronization contact and delivers the cycle signal for determining the figure position for the monitor display, the data signal and the exposure signal in accordance with a predetermined sequence by means of a microprogram to be explained later. Shift registers 136 and 138 serve for successively determining the figure position of the data in accordance with time-sharing system, and a flip flop 140 determines the alternate operation of the shift registers 136 and 138. When the shift register 136 is nominated to operate, the digital data set by the digital switch is delivered to the illuminating segments of the monitor display panel 40 and those in the illuminating diode part 157 for data recording built in the data recording device 28. The segment decoders 142 and 144 with identical construction respectively serve for monitoring and data recording. On the other hand, when the shift register 138 is selected to operate, the data set in the central operation control 134 by the input keys 64 is delivered to the illuminating segments of the monitor display panel 40 and those of the data recording device 28 through the segment decoders 142 and 144 and the segment drives 146 and 148.

Digit drivers 150 and 152 are driven by the signals from the shift registers 136 and 138 so as to determine the figure position of the data on the display panel 40. A shift register 154 delivers the determining signal representing the figure position of the illuminating diodes in the data recording device 28 through the digit driver 156. A signal wire 158 through which the exposure instruction signal is delivered so as to expose the data displayed on the monitor panel 40 to the film by means of the data recording device 28, actuates the segment decoder 142 and illuminates the exposure display part 54 on the display panel 40 through the exposure display driver 160.

Figure 6:
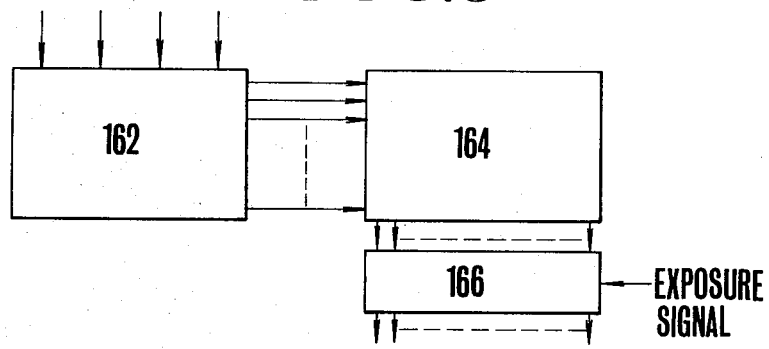
FIG. 6 shows a block diagram of a partial circuit composition of the composition shown in FIG. 5.

The segment decoder 142 is constructed as shown in FIG. 6 (and is, for example, a HD3283 made by KABUSHIKI KAISHA HITACHI SEISAKUSHO). Here, an input decoder 162 decodes the binary data into the decimal data or the like, a segment selection part 164 produces a signal representing the segment to be selected in the illuminating diode part 157 so as to obtain a display in accordance with the output of the decoder 162 and, a blanking control part 166 for controlling the signal from the segment selection part 164. The part 166 is such that the segment control signal is delivered to the segment driver part only when the exposure signal is entered.

Figure 7:
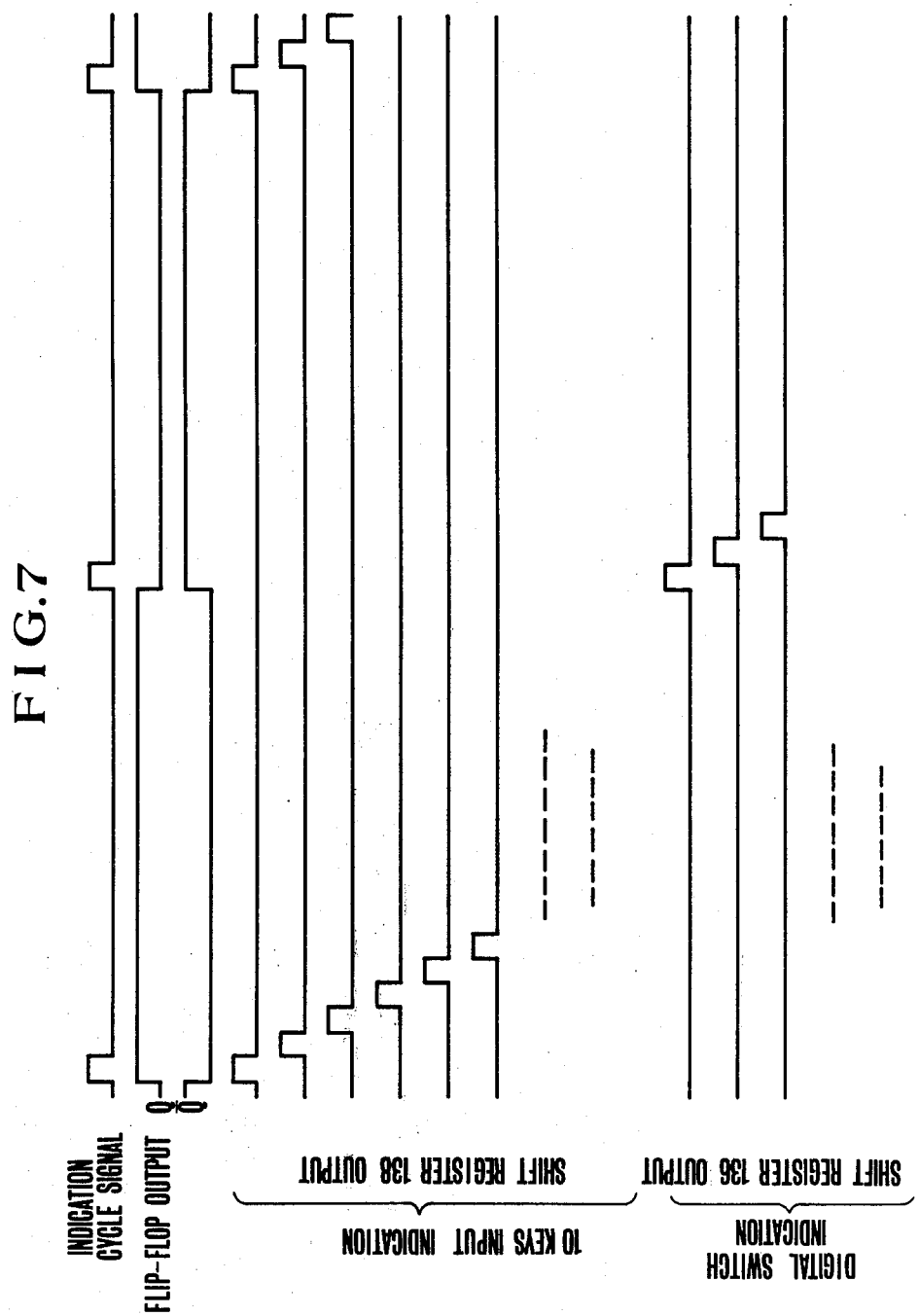
FIG. 7 shows time charts for explaining the operation of the circuit composition shown in FIG. 5.

The timing of the selection of the figure position in the data display on the display panel 40 by means of the shift registers 136 and 138 is shown in the time chart in FIG. 7.

Figure 8:
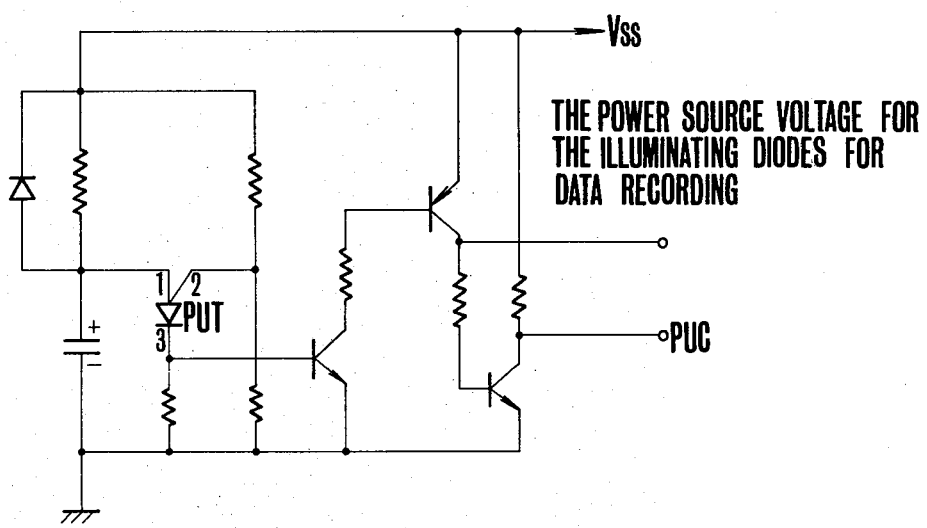
FIG. 8 shows the circuit composition for the power up clear to be applied to the circuit composition shown in FIG. 5.
Figure 9:
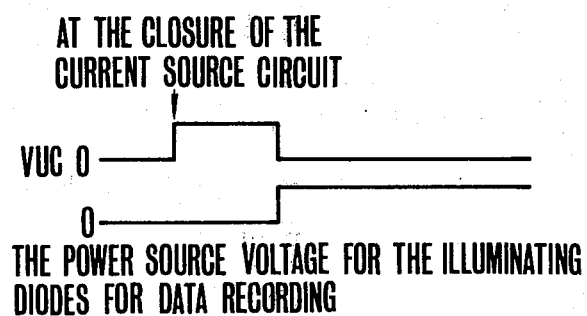
FIG. 9 shows time chart for explaining the operation of the circuit composition shown in FIG. 8.

Further, FIG. 8 shows the power up clear circuit, a comparatively important component in the present device. Generally speaking, an electronic appliance is initially unstable before stability is reached, when current is first supplied from a source. This instability should be avoided as much as possible in the data recording device 28. For example, in order to record exact data, it is absolutely essential that the data recording illumination diodes at the data recording device 28 should not light when power is first applied. The circuit shown in FIG. 8 serves to control the voltage for the illuminating diodes at the time of application of the current source circuit in order to prevent such lighting. This is shown in the time chart in FIG. 9. Also, the output at the PUC terminal, namely a signal whose level remains high for a given time at the connection to the current source circuit is also controlled by means of a logic circuit not shown in the drawing, so far as it is delivered to the blanking control part 166 shown in FIG. 6.

Further, FIG. 10 shows a detailed block diagram of the central operation control 134 shown in FIG. 5. Here, various kinds of switches 168 are provided outside of the control 134. Portion 170 is a read-only memory which includes the instruction for controlling the sequence of the central operation control 134 by means of a microprogram, 172 an address register for successively addressing in the read-only memory 170, 174 an instruction decoder for delivering the output instructions of the read-only memory 170 to each block in the circuit, 176 a shift register for delivering the time series signals to the input keys 64, the exposure time selection dial 56, various switches 168 and so on. Circuit 178, a key register for temporarily storing the time series signals produced by the shift register 176 and selected by the keys 64, 180 a key encoder for determining the switch selected in the keys 64 according to the content of the time series information stored in the key register 178, and 182 a sequence register to be set in accordance with the content of the key encoder 180. Circuit 184 is a sequence control counter for delivering the data of the sequence register 182, the address register 172, a sequence register 186 to be explained later, the instruction decoder 174 and so on to the count up address register 172 in accordance with the state of the output of the conditional flip-flop FC to be explained later and of the instruction decoder 174 and for simultaneously transmitting the content of the address register 172 to sequence registers 182 and 186 in accordance with the output of the instruction decoder 174. Element FSW is a register for the external flag for storing the time series signals of the shift register 176 selected by various external switches 168, FA and FB respectively are the registers for the internal flags to be set or reset by means of a control gate 188 to be set or reset in accordance with the output of the instruction decoder 174. A sense zero/non zero gate 190 sets the conditional flip-flop FC to be explained, judging the state of the registers FA and FB for the internal flags, the registers FSW for the external flag and a timer register TMR to be explained later in accordance with the output of the instruction decoder 174. The timer register TMR puts the execute time set and nominated by the instruction decoder 174 in the execute time decoder matrix 192. Member 194 is a timing counter for producing the standard time, 196 a timing decoder for delivering a standard control pulse to the execute time decoder matrix 192, the shift register 176, the instruction register 174 and so on in accordance with the output of the timing counter 194. Circuit RNDL is a register for storing the output of the exposure time setting dial 56, AR a main register for carrying out operation, BR and CR respectively are auxiliary registers for carrying out operation, MR a data register for monitor display data and data recording and 198 a control circuit for judging the data of various registers RNDL, AR, BR, CR and MR and transmitting the data of other registers to the main register AR.

Figure 12:
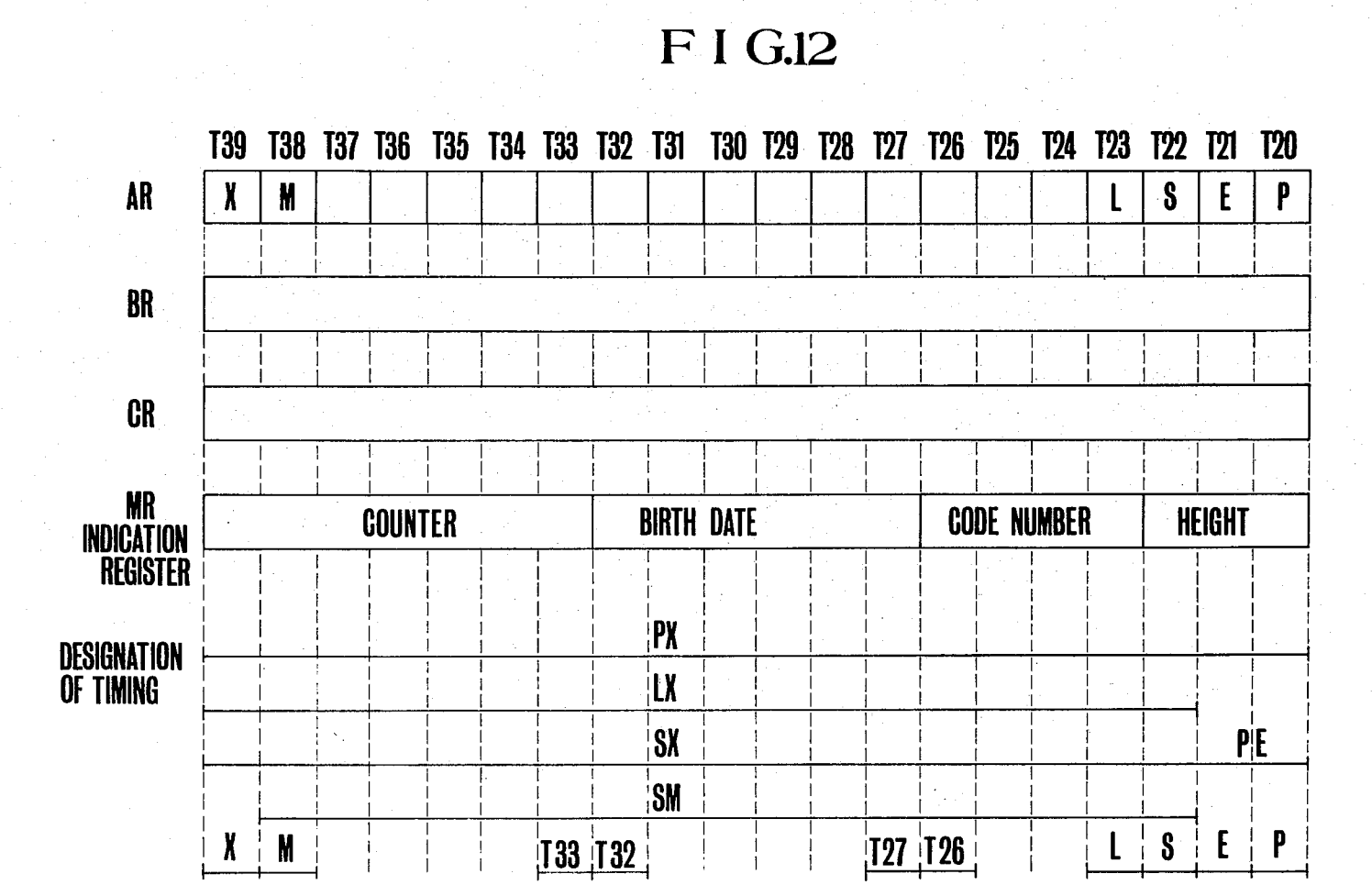

The microinstruction shown in FIG. 11 operates as follows. The read-only memory ROM 170 consists of one word, twelve bits, and is divided into the instruction systems, R-part, G-part and H-part each with four bits. Namely, each part is divided into sixteen kinds so that one word can be judged into 4096 kinds ($=16\times16\times16$). It goes without saying that for the instruction used in the present embodiment only a part of the 4096 kinds is used. The blank parts in the chart shown in FIG. 11 are those not used. The R-part and the G-part respectively nominate the operation and the operand, while the H-part nominates the execute time. The execute time serves to nominate the timing of the registers AR, BR, CR and MR as shown in FIG. 12 and the timing register TMR, the flip-flops FA and FB and the external switch FSW. The instruction is carried out only during the nominated timing, and not during other timing. Further, it is impossible to nominate all the timing only with sixteen kinds by the H-part, whereby it becomes possible to nominate the timing at any optional time by means of the instruction, providing the timing register (TMR) for H(0). In FIG. 12, each of the registers AR, BR, CR and MR consists of 20 figure positions. Each position consists of four bit parallel dispositions for a same timing so that each register consists of 80 bits. Consequently, one figure position shown in FIG. 12 shows the values covering from 0 to 9 in hexadecimal digits. The figure in each position from S to X is converted into binary coded decimals and operated as decimal digits. The display register MR is wired so that its content is displayed through the decoder, whereby the counter consists of the block from T33 to X, the date of birth of the block from T27 to T32, the code number of the block from L to T26 and the height of the block from P to S.

Below, the instructions will be explained in order. The instructions at (0000) in the R-part (hereinafter indicated R(0) in hexadecimal digit) are shown in the columns R(0):CI in the G-part. HALT is the instruction to return to the first address of ROM, RDK the instruction to jump over to the nominated address of the key operated, RTN the last instruction of the sub-routine or the instruction to return to the address next to the instruction to jump over to the sub-routine, SET-TMR the instruction to set the timer register with the nominated timing. LS-TMR is the instruction to shift the timer register to the left with the nominated timing. RS-TMR is the instruction to shift the timer register to the right with the nominated timing. 0=FA is the instruction to reset the flip-flop FA with the nominated timing. 0-FB is the instruction to reset the flip-flop FB with the nominated timing. The flip-flops FA and FB respectively consist of altogether 16 kinds of FLAG blocks shown in FIG. 11. T=TMR is the instruction to set the timer register with the nominated timing, without resetting it. 1=FA is the instruction to set the flip-flop FA with the nominated timing. 1=FB is the instruction to set the flip-flop FB with the nominated timing.

The instructions at R(1) are given in the columns R(2):C2 of the G-part. LS-AR is the instruction to shift the register AR to the left with the nominated timing. RS-AR is the instruction to shift the register AR to the right with the nominated timing.

The instructions at R(2) are given in the column R(2):SF of the G-part. SNZ-TMR is the sense instruction to set the condition flip-flop FC at 1 within the nominated timing, when the timing register is not at 0. SNZ-FA is the sense instruction to set FC at 1 with the nominated timing, when the flip-flop FA is at 1. SNZ-FB is the sense instruction to set FC at 1 with the nominated timing, when the flip-flop FB is at 1. SNZ-FSW is the sense instruction to set FC at 1, with the nominated timing, when the external switch is at 1. SNZ-KST is the sense instruction to judge whether the key is operated or not. Hence, when the key is operated KST is set at 1 while FC is set at 1. Contrary to SNZ-TMR, SZ-TMR is the sense instruction to set FC at 1 within the nominated timing when the timing register is at 0. SZ-FA, SZ-FB, SZ-FSW and SZ-KST are all the sense instructions to set FC at 1, when FA, FB, FSW and KST are at 0.

R(3) is CG (CHARACTER GENELATE) or the instruction to place a hexadecimal bit in the register with the nominated timing.

R(4) is LD (LOAD) or the instruction to transfer the content of the register BR, CR, MR or dial RNDL to the register AR with the nominated timing. After the execution of the instructions, both registers present the same content.

R(5) is STR (STORE) or the instruction to transfer the content of the register AR to the register BR, CR or MR with the nominated timing. After the execution of the instruction both registers present the same content.

R(6) is SWP (SWAP) or the instruction to change the content of the register AR for that of the register BR, CR or MR with the nominated timing.

R(7) is SRG (SENSE REGISTER) or the sense instruction to set FC at 1 with the nominated timing when the content of the operands AR, BR, CR and MR are not 0.

R(8) is ADD or the instruction to add the content of AR to that of the operands OR (meaning 0), ONE (meaning 1), RNDL (dial of the external switch), AR, BR, CR and MR shown in the columns R(4)-R(9) in the G-part with the nominated timing.

R(9) is SUB (SUBTRACT) or the instruction to subtract the above mentioned operands from the content of AR with the nominated timing.

R(A) is BL (BRANCH & LINK) or the instruction to jump over to the sub-routine, nominating the operands at the address of the sub-routine. The next address of BL is resumed by the last instruction RTN of the sub-routine. R(B) is an instruction similar to R(A) but not used in the present embodiment. R(C) is BU (BRANCH.UNCONDITIONAL) or the instruction to jump over to the nominated address (operand) unconditionally. R(D) is an instruction similar to R(C) but not used in the present embodiment.

R(E) is BC (BRANCH ON CONDITION) or the instruction to jump over to the nominated address (operand) when FC is at 1 and to advance to the next address of the instruction BC when FC is at 0. FC is at 1 even when the carrier or the borrow signal is produced by the operation signal ADD or SUB, and FC is reset automatically when the signal next to that which set FC at 1 is other than ADD, SUB, SNZ, SZ and SRZ. R(F) is also a signal similar to R(E) but not used in the present embodiment.

Below H-part (EXECUTE TIMING) will be explained. H(0) is T for nominating the timing of the set timer register.

H(1) is P for nominating the P timing (position P) of the register shown in FIG. 12.

H(2) is E for nominating the position E of the register shown in FIG. 12.

H(3) is P. E for nominating the positions P and E so that with the sense instruction of OR logic is established while FC is set at 1 when the position P or E is established.

H(4) to H(A) respectively nominate the respective position. H(B) nominates all the positions from P to X whereby when any position is established FC is set at 1 with the sense instruction.

H(C) to H(F) respectively nominate the respective position.

The block FLAG shown in FIG. 11 shows the flip-flops FA, FB and the external switch FSW. By nominating the timing 8FA, 8FB and 8FSW can be nominated independently of each other. The position of 0 mark are the flip-flops as well as the external switch used in the present invention.

Figure 13A:
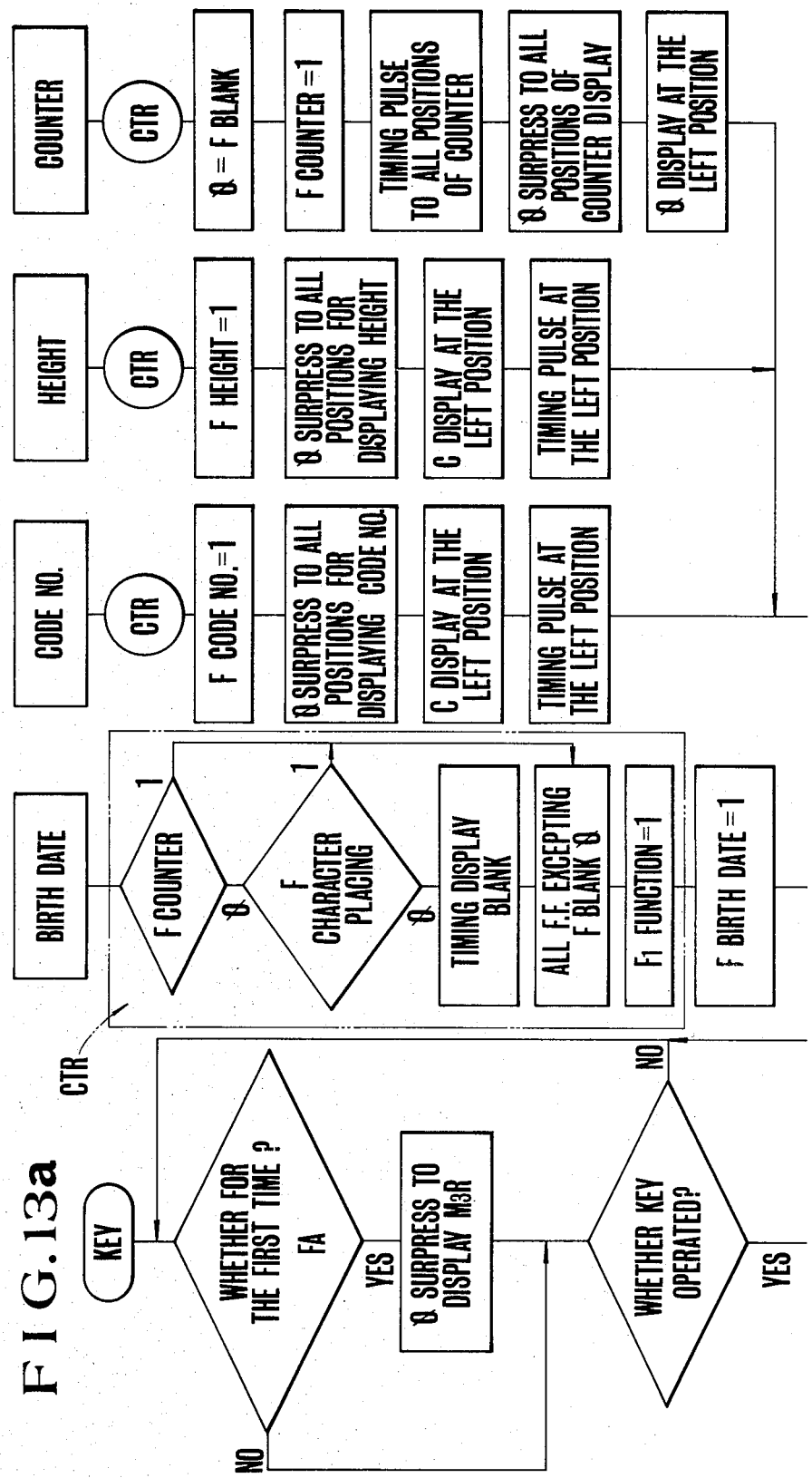
FIG. 13 shows an outlined control flow chart for making the device shown in FIG. 1 carry out the scheduled operation.
Figure 13C:
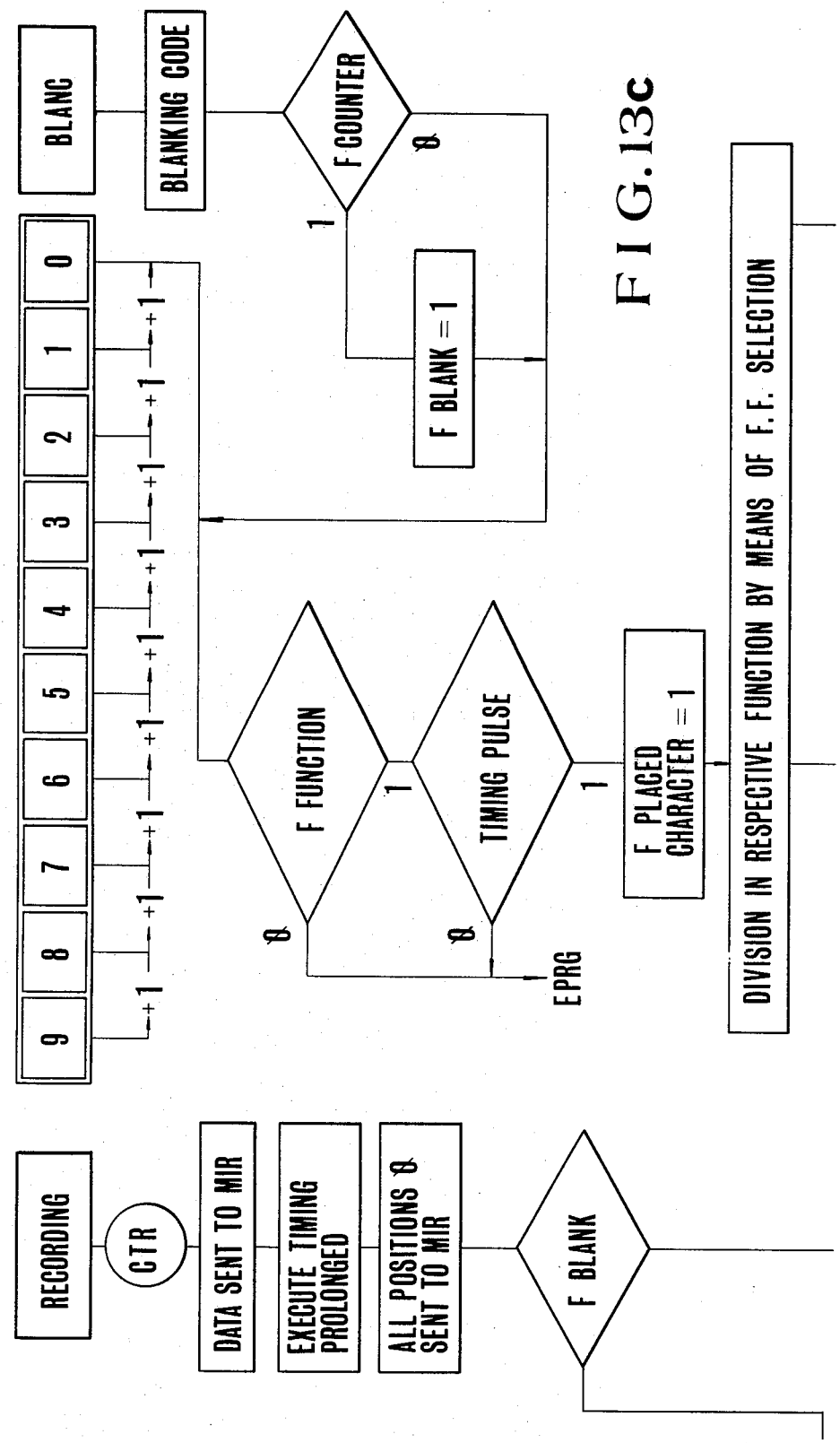
Figure 13D:
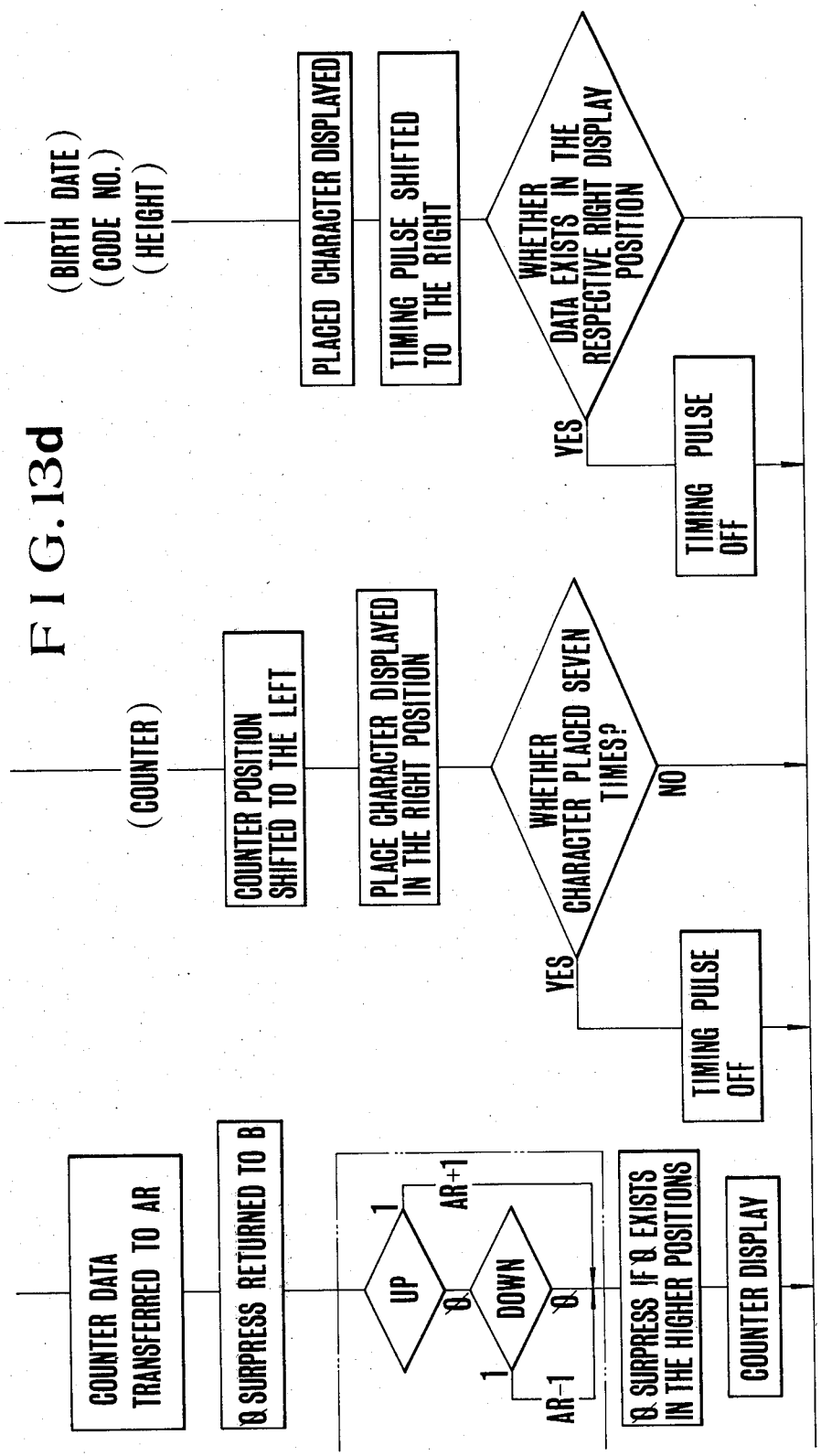

The following is the microprogram used for the present invention. The rought control flow is shown in FIG. 13, with further details explained in FIG. 14 by means of the abbreviated instruction shown in FIG. 11. The first address of ROM is start [NNN] (hereinafter the content in [ ] means the address). SNZ-FA(S) (the content in ( ) means the timing nomination) that determines whether the current source circuit is closed, the all clear key has been operated or any key is operated so that when the current source circuit is closed or the all clear key has been operated, CG, F(PX), SWP, MR(PX) are established and the display register MR are all blanked. F code means that nothing is displayed through the decoder. FA(S) is set at 1 with [EPRG] in FIG. 14 after any key is operated, whereby [NNN] jumps over to [NOK] and any influence is not given to the display register MR. Then with SZ-KST(P) whether any key is operated or not is judged in such a manner that when KST(P) is at 0, namely when any key is not operated, [NNN] is resumed while when any key is operated KST(P) is at 1 whereby with CG, 6E, 6 is produced in the position E of AR(E) and at [AAA] 1 is subtracted from 6.

Then with SRG, AR(E) the subtraction is repeated at [AAA] until AR(E) is at 0. The purpose of this subtraction is to produce a predetermined time whereby the key is not judged to have been operated again with SZ-KST(P) unless the key is operated more than the determined time. Further at LD.OR(PX) all the positions of AR are set 0 and with the last RDK jump over to the respective nominated addresses of the operated key.

The key for the date of birth operates as follows. At first the sub-routine [CTR] is resumed, whereby at [CTR] with SNZ-FA(T26) whether the counter key is operated or not is judged (FA(T26) is at 1 immediately after the operation of the counter key) while with SNZ-FA(T32) whether the figures have been placed, i.e. entered, or not is judged (FA(T32) is at 1 immediately after the operation of the figure placing key). In case the condition flip-flop FC remains at 0 with the above mentioned instructions, with the timing pulse of the timing register the position corresponding to CG, F(T), STR and MR(T) are blanked. Hereby the movement of the display C when the function key (the date of birth, the code number, the height) other than the counter key is pushed again. This blanks the position with the display C. Then all the positions of AR are set at 0 and at [CDE] all of the 8 flip-flops FA are set at 0 while FA(L) is set at 1. AT [KKK] in FIG. 15 it is programmed that nothing happens in FA(L) even if the figure entering key is operated before the operation of the function key. AT RTN the original program is restored from the sub-routine, and 1=FA(P) is the flip-flop proper to the key of the date of birth whereby the route proper to the key of the date of birth is selected when the figure entering the key to be explained below is operated, by setting 1=FA(P) at 1. Then with SET-TMR(T27) a timing pulse is produced at the position T27 of the timing register and shifted to the left at [FFF], namely a timing pulse is produced at the position T28 of the timing register. With 1=TMR(T27) the timing pulses are produced at both positions T27 and T28 of the timing register without resetting the timing pulse mentioned above. Then with SZ-TMR(T32) the instruction from [FFF] is repeated in the position T32 of the timing register until the timing pulse reaches the position T32 of the timing register, and when the timing pulse reaches the position T32 the timing pulses are produced in all the positions from T27 to T32 of the timing register. Then at CG, F(T). CG, C(T32). and STR, MR(T) all the positions for the date of birth are blanked and at the first position (T3) for the date of birth C is displayed. Then with SET-TMR(T32) the timing register is reset while only the timing pulse for the position T32 is set. The above mentioned program for the key of the date of birth is similar to that of the key for the code number or for the date of birth. They differ in that when the key for the code number, the proper flip-flop is set at FA(E) in such a manner that the timing pulses are produced in the position L to T26 of the timing register, C is displayed in the first position T26, other positions for the code number are blanked and the timing pulse is produced in the position T26 of the timing register last.

In case of the key for the height, the proper flip-flop is set at FA(PE) in such a manner that the timing pulses are produced in the position from P to S of the timing register, C is displayed in the first position S, other positions for the height are blanked and the timing pulse is produced in the position S of the timing register last. Being programmed in this way, the timing pulse still remains in the position at which C is displayed before only the above three function keys are operated so that at [CTR] of the key repushed the display C before the repushing is put out and in its stead C for the repushed function key is displayed.

When the counter key is then operated, after the passage through the sub-routine [CTR] the flip-flops FB(T27) and FA(T27) for operating the blanking key are respectively reset and set, the flip-flop FA(T33) for placing figures is set and the flip-flop FA(T26) composing [CRT] is set. Then the sub-routine [COUN] is assumed. A timing pulse is then set at the position T33 of the timing register and shifted to the left at [YYY] and after the execution of 1=MR(T33) timing pulses are set at the positions T33 and T34. Then at SZ-TMR(X) the instruction from [YYY] is executed until a timing pulse is set in the position X and after the execution of the sub-routine [COUN] the timing pulses are set at all the positions from T33 to X of the timing register. Then the original program is resumed from the sub-routine, and with CG, F(T), CG, O(T33), STR, MR(T) 0 is displayed at the last position of the counter while all other positions are blanked. Then with CG, 7(P), STR, BR(P) 7 is set in the position P of BR. Being programmed in this way, in case a function key is pushed after the operation of the counter key with the above mentioned sub-routine [CTR], 0 in the last position of the counter is not put out while C is displayed at the last position for the function key. On the other hand, when the counter key is pushed after the operation of some function key, the display C is put out while 0 is displayed in the last position of the counter. Then after the execution of the program for the respective function key mentioned above, [EPRG] is assumed so that the above mentioned FA(S) is set so as to judge whether SNG-KST(P) operates or not in such a manner that the still operated state of the key [EPRG] is resumed and the program cannot advance to the next step. Only in the freed state of the key HALT is executed in such a manner that the first address [NNN] of ROM is resumed whereby the next operation of the key is possible.

Figure 14A:
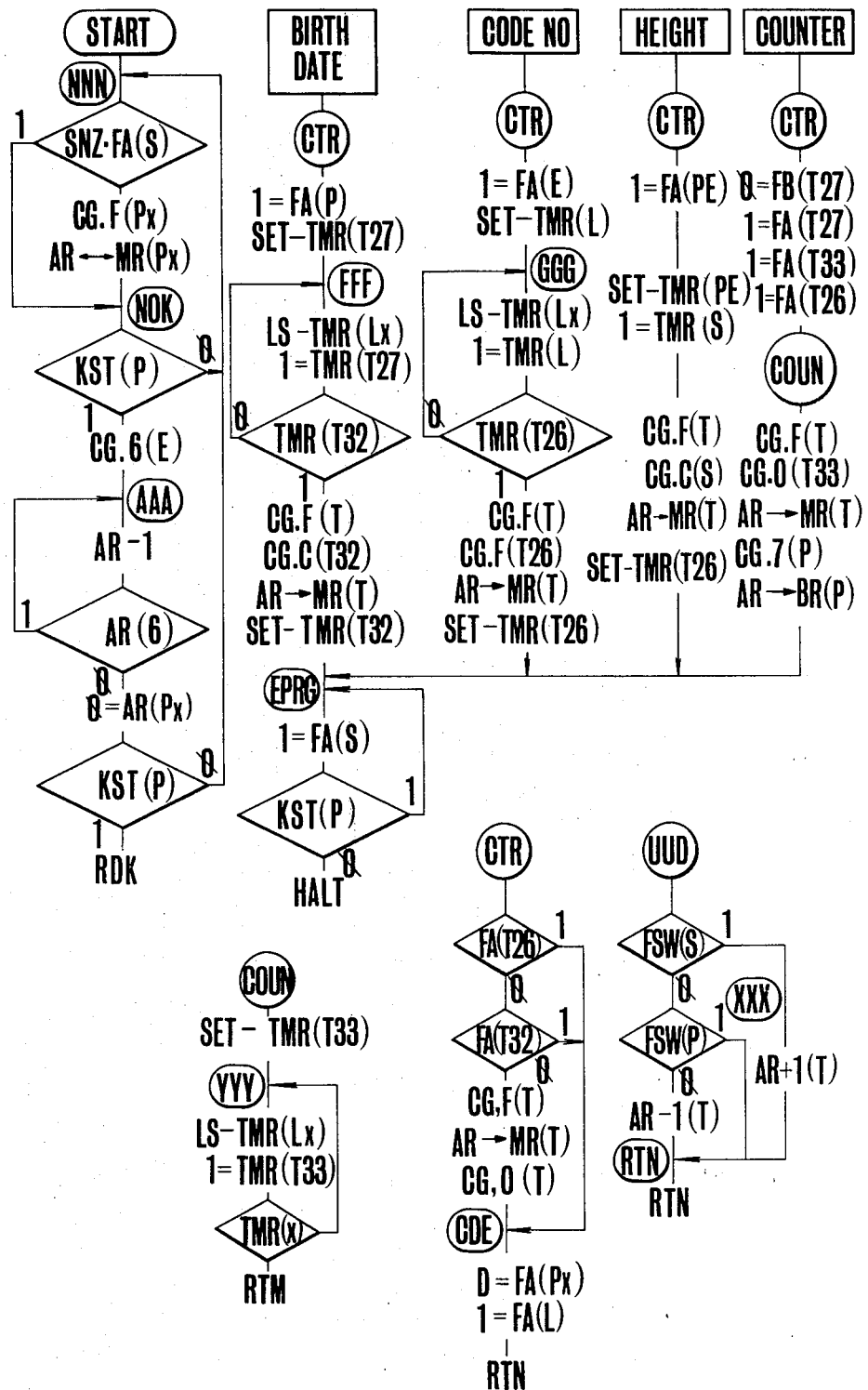
FIGS. 14 and 15 respectively show a control flow chart of the device shown in FIG. 10, explained in accordance with the instruction system shown in FIG. 11.
Figure 14B:
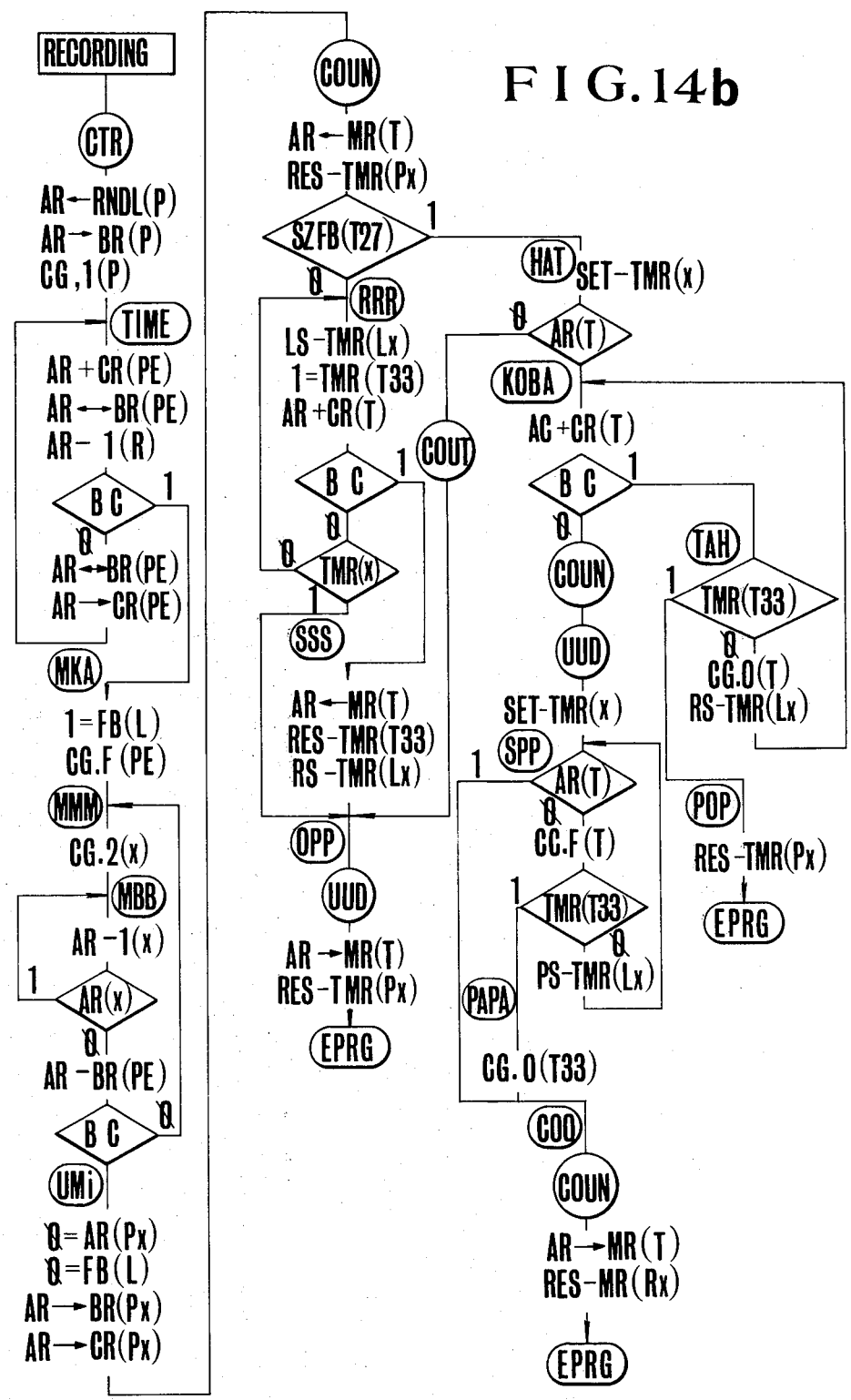
Figure 15:
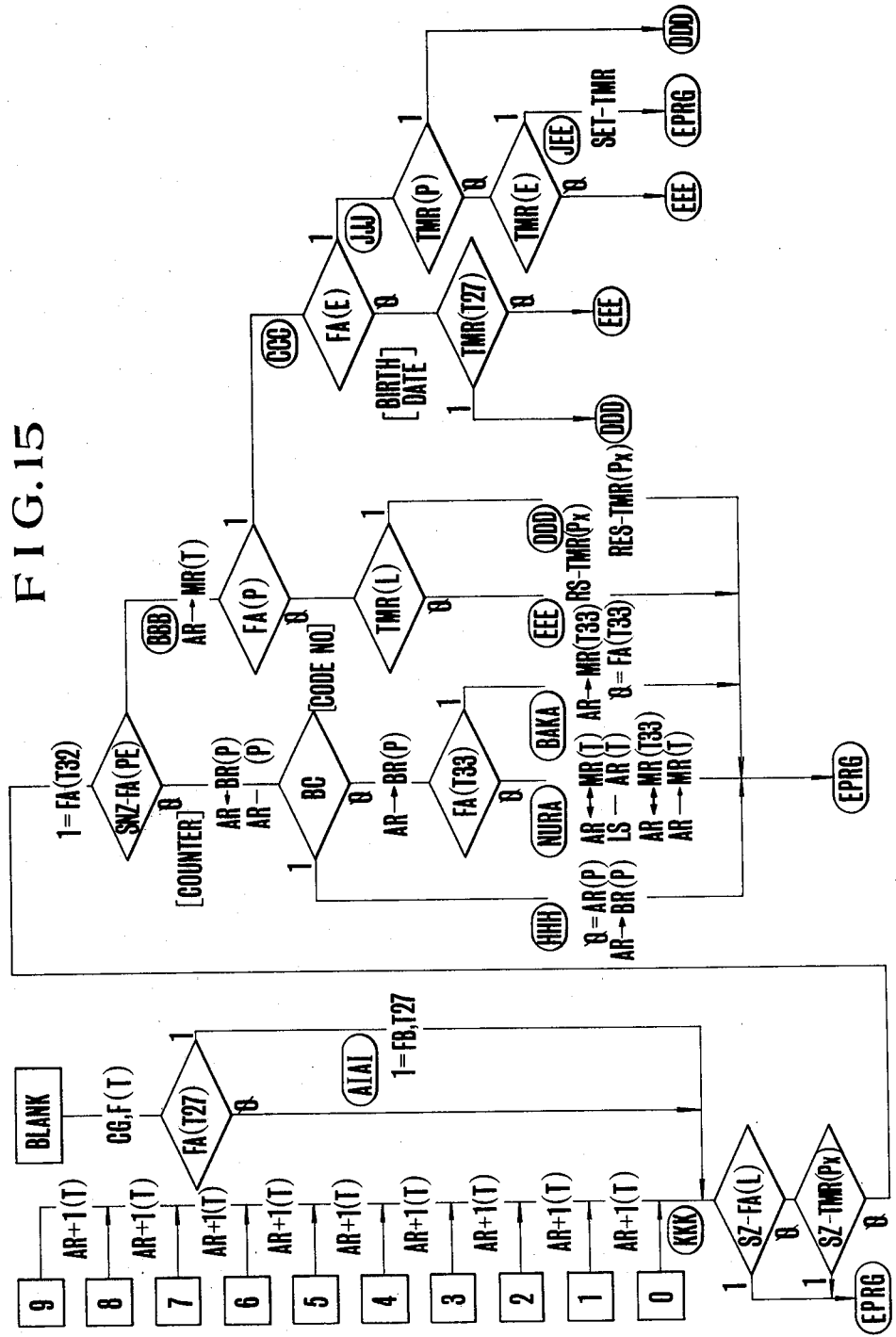

The figure placing key shown in FIG. 15 operates as follows. In case the key read at RDK in FIG. 14 is for a figure, the nominated address in FIG. 15 is assumed and with the timing pulse of the timing register as many additions as the number of the placed figure are carried out at ADD.ONE(T). With the instruction at [KKK] the placed figure is set at the nominated position of AR. Then the instruction for preventing the misoperation to jump over to [EPRG] without displaying anything when any function key is not operated at [KKK]SZ-FA(L) or when any timing pulse is not set in the timing register at SZ-TMR(PX). Then the correct operation is carried out the flip-flop for the sub-routine [CTR] is set at 1=FA(T3) and a figure is placed.

When at SNZ-FA(PE) the flip-flop is set either for P or for E of FA.[BBB] is assumed, while when the flip-flop is set neither for P nor for E the next instruction is carried out, a function key of the counter being considered as operated. In case the key is that for entering a figure after the counter key, at the above mentioned counter key with the next instruction LD.BR(P) the set value of 7 at BR(P) is brought back to AR again in such a manner that 1 is substracted from 7 at SUB,ONE(P). After the execution of this instruction 6 is set at AP(P). The purpose of this program is to judge how many times a figure is placed at the position of the counter. Because the number of the positions of the counter is altogether 7, at the 8th figure placing the instruction of SUB, ONE(P) is the operation 0-1 so as to produce a borrow signal and set the condition flip-flop FC, in such a manner that [HHH] is assumed so that the position P of AR and BR is set at 0 with LD,OR(P).STR, BR(P), whereby further figure entries are locked.

When a figure is now entered for the first time after the operation of the counter key, with SUB,ONE(P) no borrow signal is produced so that with STR,BR(P) the value substracted 1 from 7 namely 6 is set at the position P of BR again and the next instruction of SNZ-FA(T33) is assumed. With this instruction [BAKA] is assumed because at first FA(T33) is set after the operation of the counter key with STR,MR(T33) the figure of the figure entry key is displayed in the last position of the counter FA(T33) is then reset, the first address being resumed from [EPRG]. From the second figure placing [MURA]SWP,MR(T) is assumed instead of [BAKA] because this time FA(T33) has been reset, and AR is changed for MR for all the positions of the counter, displaying the figure placed, i.e., entered for the second time in the last position of the display register MR. Then with LS-AR(T), the figure placed for the first time is reshifted to T33 of AR and then with LD, MR(T33) the figure in the last position of MR, namely placed for the second time is conveyed to T33 of AR while with STR,MR(T) all the positions of the counter of AR is transmitted to MR. That is, the figures placed in the last two positions of the counter are displayed. In this way the figures placed up to 7 times are successively displayed, being shifted to the left. Above the 8 times the shifting is locked as mentioned above. In case of the function keys other than the counter key either the P timing or the E timing of the flip-flop is set so that [BBB] in FIG. 4 is directly assumed. When now a figure of respective function key is placed, i.e., entered the first time, with STR,MR(T) the entered figure is displayed in the first position for respective function, because a timing pulse is set in the first position of respective function of the timing register. Then with SNZ-FA(P) the code number and other functions are told from each other. Hence, in case the code number key has been operated the next instruction of SNZ-TMR(L) is assumed because FA(P) is not set, so as to judge whether the position L of the timing register is set or not. Because a figure is placed for the first time no timing pulse is not set in the position L, so that with RS-TMR(PX) at [EEE] the timing pulse is shifted to the right in the position T25. Thus, the next figure placing is possible. Contrary to the above mentioned counter in the present case the figures placed are successively shifted to the right from the first position so as to be displayed. When the figure of the code number is placed four times in this way, the timing pulse is set in the position L so that [DDD] is directly assumed in such manner that with RES-TMR(PX) all the positions of the timing register are reset. That is, with the next instruction SZ-TMR(PX) at [KKK] the timing pulse has been reset so that the figure is no longer placed whereby the figure placing is automatically locked after all the positions of the code number have been set.

Because after the operation of the key for the date of birth only the flip-flop FA(P) is reset [CCC] is directly assumed, while with SNZ-FA(E) nothing happens and with SNZ-TMR(T27) by means of a similar program to that of the above mentioned code number figures are placed maximum up to 6 positions. Because after the operation of the key for the height both of the flip-flops FA(P) ad FA(E) have been set [JJJ] is directly assumed whereby by means of a similar program to that of the code number figures are placed maximum up to 3 positions.

In case the blanking key is then set, the blanking code F is set to the timing pulse nominated by CG.F (T), with SNZ-FA(T27) the flip-flop FB(T27) is set only in case of the blanking key after the setting of the counter key which [KKK] is directly assumed without setting FB(T27) in case of other function keys. After that the operation is the same as for the figure placing.

Below the case with the recording key in FIG. 14 will be explained. In case C is displayed with sub-routine [CTR], the display is put out and with LD,RNDL(P) a figure is led to the position P of AR from the external digital switch dial. Then the figure is transferred to the position P of BR. Then with CG,1(P) 1 is set in the position P of AR and with [TIME-]ADD,CR(PE) 01+00 (=01). That is, all the positions of CR are set at 0 so that after all 1 remain set in the position P of BR. Then with SUB,ONE(P) 1 is subtracted from the value of the dial. When a borrow signal is produced now [MKA] is directly assumed. Now let us suppose that the dial value is 3. Because no borrow signal is produced, with the next instruction of SWP,BR(PE) 1 is set in the position P of AR, 0 in the position E of AR, 2 in the position P of BR and 0 in the position E of BR. (A value subtracted 1 from the dial value) with the next instruction STR,CR(PE) 1 is set in the position P of CR while 0 is set in the position E of CR and then [TIME] is directly assumed whereby the same instruction is carried out. When [MKA] is directly assumed, a borrow signal being produced, 4 is set in the position P of BR while 0 is set in the position E of BR. That is, the purpose of this program is to convert the equal difference series of dial values into the multiple series. For example, when the dial value is 0, 1 is set in the position P of BR, when the dial value is 1, 2 is set in the position P of BR and when the dial value is 2, 4 is set in the position P of BR. Hereby, for the positions P and E, the hexadecimal operation is carried out. With 1=FB(L) of [MKA] this flip-flop signal is led out so as to be utilized as the signal for switching on the release of the camera as well as the signal for inducing LED at the side of the back cover of the camera to illuminate. With CG,F(PE) F is set at the positions P and E of AR. The programs from [MMM] to SRG,AR(X) is intended only for spending the time for 7 steps, namely the illuminating time adjusting program for LED at the side of the back cover of the camera. SUB.BR is the instruction to substract the dial value converted into multiple series values for the FF value of AR. Thus, when no borrow signal is produced after the execution of this instruction [MMM] is resumed so that the operation is repeated. The time since as the result a borrow signal is produced fill the LED at the side of the back cover of the camera is put out with LD,OR(PX), 0=FB(L) of [UMI] can be varied and set by means of the multiple series of the dial value. With STR, BR(PX), STR, CR(PX), all the positions of BR and CR are set at 0. Then the sub-routine [COUN], in all the positions of the counter of the timing register timing pulses are set, with LD, MM(T) all the positions of the counter display register are led to AR, with RES-TMR(PX) the timing register is reset and with SZ-FB(T27) whether the blanking key is operated for the position of the counter or not is judged whereby when it is found that the blanking key has been operated [RRRT9 is assumed. With LS-TMR(LX) nothing takes place because the timing register is in the reset state, with 1-TMR(T33) a timing pulse is set in the last position T33 of the counter and the F code is detected with ADD,CR(T). Because all the positions in the counter have been converted into BCD while all the positions of CR are set at 0, when the F code is set at the nominated position of AR, F+0 is detected and a carrier signal is produced so that the detection of F becomes possible. If now, no F code is set in the last position of the counter, with [RRR] timing pulses are successively shifted to the left until a timing pulse is set at the first position of the counter with SZ-TMR(X) so as to detect the F code. At the time at which the F code is detected [SSS] is directly detected, with LD, MR(T), RES-TMR(T33), RS-TMR(LX) the set values from the last position of the counter to the position in which the F code is set are transferred to AR so that the timing impulses from the last position of the counter up to that next to the position in which the F code is set are set in the timing register. Then [OPP] is assumed, the sub-routine [UUD] is directly assumed whereby with the external switch FSW(S) and FSW(P) whether the counter is to be set for counting up or for counting down from photograph to photograph or the data are to be fixed is judged.

When FSW(S) is set, [XXX] is directly assumed and the counter is set for counting up, when FSW(P) is set, the data are fixed, while both switches are not set, the counter serves as a down counter. It goes without saying that this operation is carried only during the time for the timing pulse of the timing counter, so that the positions higher than that for the blanking are treated for the fixed data, free from the influence of the operation.

When with RTN from [UUD] the original program is resumed, it is displayed with STR,MR(T), with RES-TMR(PX) the timing register is reset, [EPRG] is directly assumed and the next key operation is awaited. Then in case the blanking key is not operated for the position of the counter, [HAT] is directly assumed from SZ-FB(T27). With SET-TMR(X) a timing pulse is set at the first position of the counter, then with SRG, AR(T) the first position of the counter is set at 0 or not whereby it is set at 0 with the sub-routine [COUN] or [OPP] operations are carried out for all the positions of the counter and displayed, the timing register is reset and the next key operation is awaited. In case the first position of the counter is not set at 0, with SRG,AR(T) [KOBA] is directly assumed and with ADD,CR(T) the blanking code is detected. Because the blanking key is not operated this blanking code is that for the 0 supress in the first position of the counter. If now the blanking code F is set in the first position of the counter, with [KOBA] a carrier signal is produced so that [TAH] is directly assumed and with SNZ-TMR(T33) whether the timing pulse is set in the last position of the counter or not is judged whereby when it is not set in the position, with CG,O(T), 0 is set instead of the blanking code. Then with RS-TMR(LX) the timing pulse is shifted to the right, [KOBA] is resumed so as to detect the next F code. That is, the purpose of this program is to detect up to which position the F code is set, the shift being successively carried out from the first position of the counter to the right. In case now the F code are set in all the positions of the counter, [POP] is directly assumed so as to reset the timing register, giving no influence to the display register MR. In case now with [KOBA] no carrier signal is produced for a certain position, the operation instruction of sub-routine [COUN] and [UUD] are carried out. The operation here is carried out after the F code in the first position is converted into 0. Then 0 in the first position has to be converted into F code so as to be displayed. The program therefore will be explained.

With SET-TMR(X) a timing pulse for the first position is produced and with SRG,AR(T) 0 is detected whereby when it is detected, with CG,F(T) 0 is converted into the F code and with SNZ-TMR whether the detection is carried out down to the last position or not is detected and in case the detection is not yet carried out down to the last position, RS-TMR(LX) shifts the timing pulse to the right so as to detect the next 0. In case it is confirmed that all the positions down to the last are set at 0, [PAPA] is directly assumed whereby the CG,O(T33) 0 is set at the last position from the beginning. With [SPP] it is found that a certain position is not set at 0, when with [COO] a timing is produced for all the positions and displayed with STR, MR(T) whereby the timing register is reset, [EPRG] is directly assumed, the first address of ROM is resumed and the next key operation is awaited.

As explained above the microprogramming as mentioned above carries out the data settting as well as the data recording with certainty.

The comparison table between the addresses of the above mentioned read-only memory 170 and the instructions is given in FIG. 16.

The embodiments of the present invention are not necessarily limited to those mentioned above. For example, it is possible to realize various variations by varying the instructions of the read-only memory so that the applicability can be said to be very wide.

Figure 17:
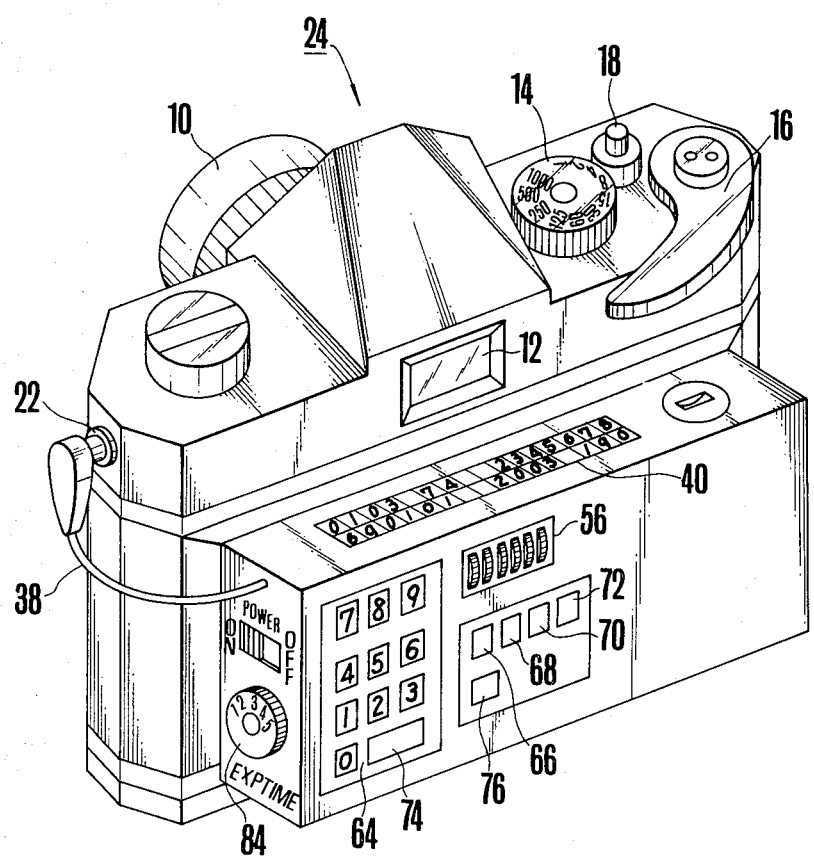
FIG. 17 shows another embodiment of the data printing device in accordance with the present invention in perspective view.

In the above mentioned embodiments the data recording device is composed separately from the control part while as shown in FIG. 17 the data setting part and the control part can be composed as one body with regard to the camera device body.

Figure 18:
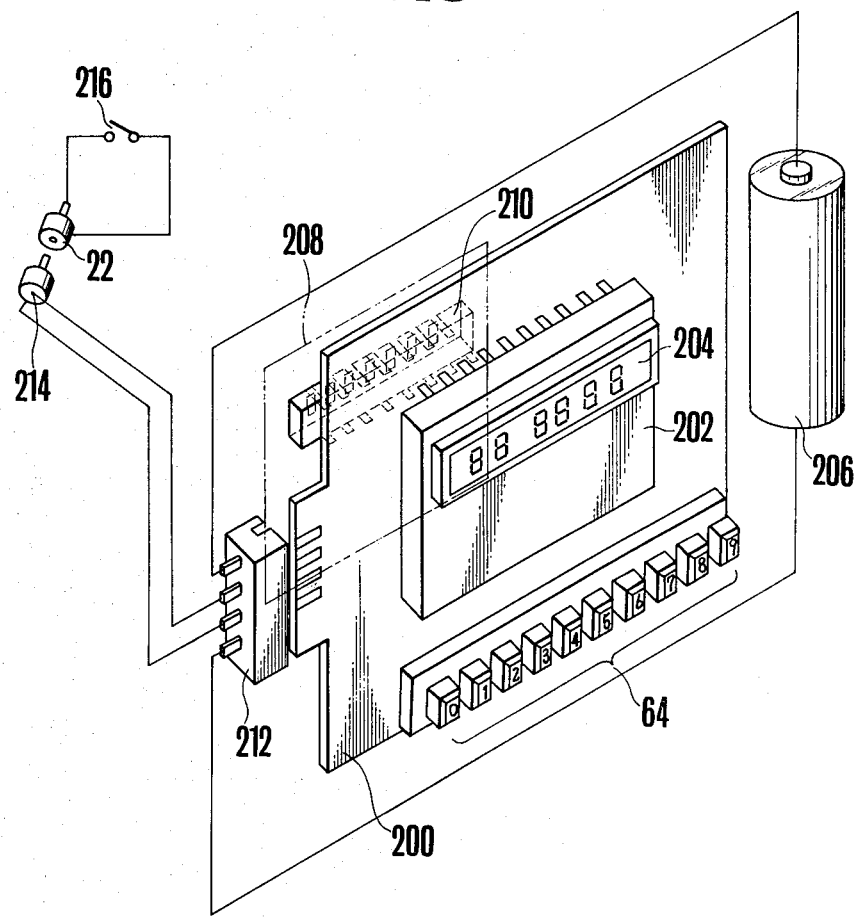
FIG. 18 shows the internal compositions of the composition shown in FIG. 17.

In the present case by applying the technics of the integrating circuit both the control part and the data recording part can be constructed on one or two base plates as one body as shown in FIG. 18 so that the device can be realized remarkably compact.

In FIG. 18, member 200 is the glass base plate, 202 an integrated circuit including the control part, 204 the monitor display illuminating part composed as one body on the integrated circuit 202, 206 the current source for driving the device, 208 the opening through which the data is recorded on the film in the camera device 24 from the back, 210 the illuminating diode numerical figure display part for recording the data set by the keys 64 on a film from the back through the above mentioned opening 208, 212 the connector with the external circuit, 214 a synchronization plug connected with the synchronization contact 22 and 216 a synchronization switch for obtaining a timing for data recording, inducing the above mentioned numerical figure display part 210 to illuminate.

Further in case the timing for data recording is obtained from the synchronization contact, for example, in case of the flash light or the speed light photography unprofitable noises are at times produced at the synchronization contact. Therefore, in case the timing for the data recording is obtained for the synchronization contact, the influences of the noises due to the flash light or the speed light is avoided by means of a circuit as shown in FIG. 19.

Lastly it goes without saying that the application of the present invention is not necessarily limited to the camera for preparing personal identification cards as is referred to in the above mentioned embodiment but can be applied for various other purposes.

What is claimed is:
1. A camera data recording system, comprising:
 (a) a ten-key device to set numerical data,
 (b) a dial device to set numerical data,
 (c) a memory circuit to memorize the numerical information set by one of said ten-key device and said dial device,
 (d) light emitting display means to direct the numerical information memorized in said memory circuit onto a film location
 (e) a control circuit to allow said light emitting display means to perform a data recording operation; and
 (f) select means coupled to the control circuit for making a selection of whether the data which have been set by the dial device are recorded.

2. A camera data recording system according to claim 1, further comprising first operating means for causing the numerical information set by the ten-key device to be memorized in the memory circuit, and second operating means for causing the numerical information set by the dial means to be memorized in the memory circuit.

3. For a camera with a release and for use with a film, a camera data recording system, comprising:
 (a) information setting means to set nunerical information,
 (b) a memory circuit to memorize the information set by said setting means,
 (c) data recording light emitting means to record the numerical information set in said memory circuit onto the film when the film is mounted therein,
 (d) a data recording control circuit for driving said light emitting means to effect a data recording operation, the control circuit having an incrementing function to increase values memorized in said memory circuit after the data recording operation is performed and a decrementing function to decrease values memorized in said memory circuit after the data recording operation is performed, and
 (e) selecting means for selecting said increment or decrement function.

4. For a camera defining a film recording location, a camera data recording system, comprising:
 (a) information setting means to set numerical information,
 (b) a memory circuit to memorize the information set by said setting means,
 (c) data recording light emitting display means to direct the numerical information set in said memory circuit onto the recording location, (d) a data recording control circuit for driving said light emitting means for a prescribed length of time to effect a data recording operation, and (e) a decrementing circuit to decrement the value memorized in said memory circuit after the data recording operation is effected by said control circuit.

5. A camera data recording system, comprising:

(a) information setting means to set numerical information, (b) a memory circuit for memorizing the information set by said setting means, (c) data recording light emitting display means to record the numerical information set in said memory circuit onto a location for a film surface, (d) a data recording control circuit having a timer circuit to be activated in response to a camera release for generating an output for a prescribed length of time, and a driving circuit for activating said light emitting display means in response to the output of said timer circuit, and (e) a decrementing circuit for detecting the completion of the operation of said timer circuit and decrementing the value memorized in said memory circuit.

6. A data recording device for mounting in the back lid of a camera, comprising:

(a) a select key to select different kinds of recording data;

(b) a numerical data setting key for setting the kind of numerical data selected by the select key;

(c) a memory element to memorize the numerical data set by the select key;

(d) display means for monitoring data, said display means having a plurality of numerical display elements, each numerical display element including segment elements for displaying the numerical data memorized in the memory element;

(e) recording display means at an internal plane of the back lid, said display means having a plurality of numerical display elements, each numerical display element including segment elements for recording the display data onto a film surface;

(f) receiving means to receive a recording signal, which is produced in association with an exposure action of the camera; and (g) a control circuit connected to said receiving means for effecting a recording operation of the data displayed by the recording display means in response to the signal received by the receiving means.

* * * * *